(12) United States Patent
Cevik et al.

(10) Patent No.: US 12,148,566 B2
(45) Date of Patent: *Nov. 19, 2024

(54) METHOD FOR INCORPORATING MOLYBDENUM CARBIDE NANOSHOOTS INTO NANOCOMPOSITE ELECTRODE

(71) Applicant: Imam Abdulrahman Bin Faisal University, Dammam (SA)

(72) Inventors: Emre Cevik, Dammam (SA); Ayhan Bozkurt, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,634

(22) Filed: Nov. 28, 2023

(65) Prior Publication Data

US 2024/0096564 A1 Mar. 21, 2024

Related U.S. Application Data

(63) Continuation of application No. 18/298,057, filed on Apr. 10, 2023, now Pat. No. 11,869,714, which is a (Continued)

(51) Int. Cl.
*H01G 11/32* (2013.01)
*H01G 11/62* (2013.01)
(Continued)

(52) U.S. Cl.
CPC ............ *H01G 11/32* (2013.01); *H01G 11/62* (2013.01); *H01G 11/64* (2013.01); *H01G 11/86* (2013.01)

(58) Field of Classification Search
None
See application file for complete search history.

(56) References Cited

U.S. PATENT DOCUMENTS 11,682,531 B1 * 6/2023 Cevik .................... H01G 11/62
                                                    361/502
11,869,714 B2 * 1/2024 Cevik .................... H01G 11/62
(Continued)

FOREIGN PATENT DOCUMENTS

CN         105977049 A  *  9/2016
CN         106694006 A     5/2017
(Continued)

OTHER PUBLICATIONS

Translation (Year: 2016).*
(Continued)

*Primary Examiner* — Dion R. Ferguson
(74) *Attorney, Agent, or Firm* — Oblon, McClelland, Maier & Neustadt, L.L.P.

(57) ABSTRACT

A nanocomposite electrode and a method of making the nanocomposite. The nanocomposite electrode includes an electrode substrate, nitrogen-doped molybdenum carbide nanosheets, at least one electrolyte, at least one binding compound, and at least one conductive additive. The electrode substrate is coated with a mixture of the nitrogen-doped molybdenum carbide nanosheets, at least one binding compound, at least one conductive additive, and at least one electrolyte, where the electrolyte penetrates the pores of the nitrogen-doped molybdenum carbide nanosheets, and where the nitrogen-doped molybdenum carbide nanosheets are an outer layer of the electrode.

12 Claims, 24 Drawing Sheets

Related U.S. Application Data continuation of application No. 17/579,789, filed on Jan. 20, 2022, now Pat. No. 11,682,531.

(51) Int. Cl.
*H01G 11/64* (2013.01)
*H01G 11/86* (2013.01)

(56) References Cited

U.S. PATENT DOCUMENTS

| | | | |
|---|---|---|---|
| 2015/0179356 A1 | 6/2015 | Gardner | |
| 2017/0062143 A1 | 3/2017 | Zhamu | |
| 2020/0321165 A1 | 10/2020 | Choi | |

FOREIGN PATENT DOCUMENTS

| | | | | |
|---|---|---|---|---|
| CN | 106024403 | B | 6/2018 | |
| CN | 108321375 | A | 7/2018 | |
| CN | 108899218 | A | 11/2018 | |
| CN | 109037664 | A | 12/2018 | |
| CN | 108899218 | B | 10/2019 | |
| CN | 110428983 | A | 11/2019 | |
| CN | 10-2052000 | | 1/2020 | |
| CN | 111013635 | A | 4/2020 | |
| CN | 108321375 | B | 6/2020 | |
| CN | 111558387 | A | 8/2020 | |
| CN | 111354576 | B | 5/2022 | |
| WO | WO-2013031487 | A1 * | 3/2013 | ............ H01G 11/38 |

OTHER PUBLICATIONS

Translation (Year: 2013).*
Gurusamy, et al.; Hierarchical N-Mo C /Mo C nanohybrids and their superior supercapacitor performance in an ionic liquid electrolyte ; Journal of Energy Storage, vol. 44, Part A ; Dec. 1, 2021; Abstract Only; 3 Pages.
Meng, et al.; Synthesis of in-situ graphene encapsulated N-doped MoC nanoparticles as high-rate and long lifespan anode for lithium-ion storage ; Materials Letters, vol. 252 ; pp. 282-285 ; Oct. 1, 2019; Abstract Only; 3 Pages.
Wang, et al.; Convenient one step synthesis of molybdenum carbide embedded N-doped carbon nanolayer hybrid architecture using cheap cotton as precursor for efficient hydrogen evolution ; Journal of Electroanalytical Chemistry, vol. 824 ; pp. 207-215 ; Sep. 1, 2018; Abstract Only; 3 Pages.

* cited by examiner

METHOD FOR INCORPORATING MOLYBDENUM CARBIDE NANOSHOOTS INTO NANOCOMPOSITE ELECTRODE

CROSS-REFERENCE TO RELATED APPLICATIONS

The present application is a Continuation of U.S. application Ser. No. 18/298,057, now allowed, having a filing date of Apr. 10, 2023 which is a Continuation of U.S. application Ser. No. 17/579,789, now U.S. Pat. No. 11,682,531 having a filing date of Jan. 20, 2022.

STATEMENT OF PRIOR DISCLOSURE BY THE INVENTOR

Aspects of the present disclosure are described in E. Cevik, S. T. Gunday, A. Iqbal, S S. Akhtar, A. Bozkurt, "Synthesis of hierarchical multilayer N-doped Mo2C@MoO3 nanostructure for high-performance supercapacitor application", 2022; Journal of Energy Storage; 46; 103824, incorporated herein by reference in its entirety.

BACKGROUND

Technical Field

The present disclosure is directed to an electrode, and particularly to a nanocomposite electrode, and a process for preparing the same.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Nanocomposites are heterogeneous/hybrid materials formed of mixtures of polymers with inorganic solids (clays to oxides) at the nanometric scale. One of the major applications of nanocomposites is in the field of energy storage devices, particularly in supercapacitors (SCs). Integration of the nanocomposites in the electrodes of SCs provides enhanced electrochemical performance characteristics such as, high power density, excellent capacitive properties, high energy density and long-life cycle.

Some of the major characteristics an ideal electrode material for a SC must possess are acceptable corrosion resistance, high surface area, excellent chemical stability, high ion/electron conductivity, cost and toxicity. Therefore, to fulfill future requirements, it is crucial to produce advanced and efficient electrode materials bearing high catalytic activity, enhanced energy/power densities and durability. Conventionally, porous carbon materials with various unique properties i.e., high surface area, excellent electrical conductivity and superior pore size distribution have been considered highly suitable for applications in supercapacitors. However, these materials have several disadvantages such as, difficulty in mass production, high cost, low packing, and lower cycling life.

Recently, several transition metal nitrides such as manganese nitride ($Mn_3N_2$), chromium nitride (CrN), vanadium nitride (VN), niobium nitride (NbN), titanium nitride (TiN), and iron nitride ($Fe_2N$), and transition metal carbides, such as, molybdenum carbide ($Mo_2C$) have been explored for integration of the metal nitrides into the electrodes of the SC's. However, further development is required to achieve high performance. Accordingly it is one object of the present disclosure to provide nanocomposite materials that permit the construction of SCs having high surface area, excellent chemical stability, high ion/electron conductivity, high catalytic activity, enhanced energy/power densities and durability, and low toxicity.

SUMMARY

The present disclosure presents a nanocomposite electrode including an electrode substrate, nitrogen-doped molybdenum carbide nanosheets, at least one electrolyte, at least one binding compound, and at least one conductive additive. The electrode substrate is coated with a mixture of the nitrogen-doped molybdenum carbide nanosheets, at least one binding compound, at least one conductive additive, and at least one electrolyte, such that the electrolyte penetrates the pores of the nitrogen-doped molybdenum carbide nanosheets and the nitrogen-doped molybdenum carbide nanosheets are an outer layer of the electrode.

In an embodiment, the mixture comprises 1-15 wt. % of the nitrogen-doped molybdenum carbide nanosheets, and 85-99 wt. % of the at least one electrolyte, at least one conductive additive, and at least one binding compound based on the total weight of the nitrogen-doped molybdenum carbide nanosheets, the conductive additive, the binding compound, and the electrolyte.

In an embodiment the electrolyte is at least one polyol compound mixed with at least one selected from the group consisting of an alkali metal hydroxide, an alkaline earth hydroxide, an alkali metal salt, and an alkaline earth salt to form a gel electrolyte. The polyol compound is at least one selected from the group consisting of glycerol, ethylene glycol, and propylene glycol. In an embodiment, the binding compound is selected from the group consisting of a polyvinylidene fluoride and N-methyl pyrrolidone (NMP). In an embodiment, the conductive additive is selected from the group consisting of graphite, activated carbon, reduced graphene oxide, carbon nanotubes, carbon nanofibers, and carbon black. In an embodiment, the electrode substrate is a mesh made from one or more materials from the group consisting of, stainless steel, aluminum, nickel, copper, platinum, zinc, tungsten, and titanium.

In an embodiment, the mixture coated on the electrode substrate has a contact angle of less than 40°.

In an embodiment, the nitrogen-doped molybdenum carbide nanosheets have a substantially crystalline structure with a spacing of 5-15 nanometers (nm) between each nanosheet.

In yet another embodiment, the nitrogen-doped molybdenum carbide nanosheets have a surface area of 250-300 square meter per gram ($m^2/g$), and a pore size of 5-15 nm.

In an embodiment, the nitrogen-doped molybdenum carbide nanosheets include $MoO_3$, $Mo_2C$, and $Mo_2N$ phases.

The present disclosure also provides a method of making the nanocomposite electrode. The method includes dissolving at least one binding compound, at least one conductive additive, and at least one electrolyte to form a slurry. The method further includes mixing 1-15 wt. % of the nitrogen-doped molybdenum carbide nanosheets into the slurry creating a synthesis mixture and coating the synthesis mixture onto the electrode surface to form the nanocomposite electrode. The method also includes drying the nanocomposite electrode at a temperature less than 100° C.

The present disclosure also discloses a supercapacitor device including the nanocomposite electrode. The supercapacitor device includes two symmetrically facing nanocomposite electrodes, such that the electrode substrate of each nanocomposite electrode is coated with the mixture on an inside facing surface and the outer surfaces of the nanocomposite electrodes are not coated with the mixture, and the inner nitrogen-doped molybdenum carbide nanosheets layers are separated by an electrolyte.

In an embodiment, the supercapacitor device has a power density of 2.2-2.6 watt per kilogram (W/Kg), and an energy density 15-40 Watt-hours per kilogram (Wh/Kg).

In an embodiment, the supercapacitor device has a specific capacitance of 300-350 farad per gram (F/g) at 0.5 ampere per gram (A/g).

In an embodiment, at least 85% of the initial specific capacitance is maintained in the supercapacitor device after 30 days in ambient conditions In an embodiment, 2-10 of the supercapacitor devices are connected in parallel and/or series.

In an embodiment, the supercapacitor device has an equivalent series resistance of 3-15 Ohm.

In an embodiment, the supercapacitor device is electrically connected to a sensor and functions as a battery in a wearable device.

The present disclosure also provides a method of making the nitrogen-doped molybdenum carbide nanosheets. The method includes mixing $MoO_4^{2-}$ molybdate ion and an amine substituted heterocycle in a protic solvent, and removing the protic solvent through heating, leaving a dried solid. The method further includes pulverizing the dried solid, followed by calcining and nitrogen doping the pulverized solid by flowing nitrogen gas over the pulverized solid at a temperature less than 850° C. Furthermore, the method includes cooling the sample under inert atmosphere leaving nitrogen-doped molybdenum carbide nanosheets.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
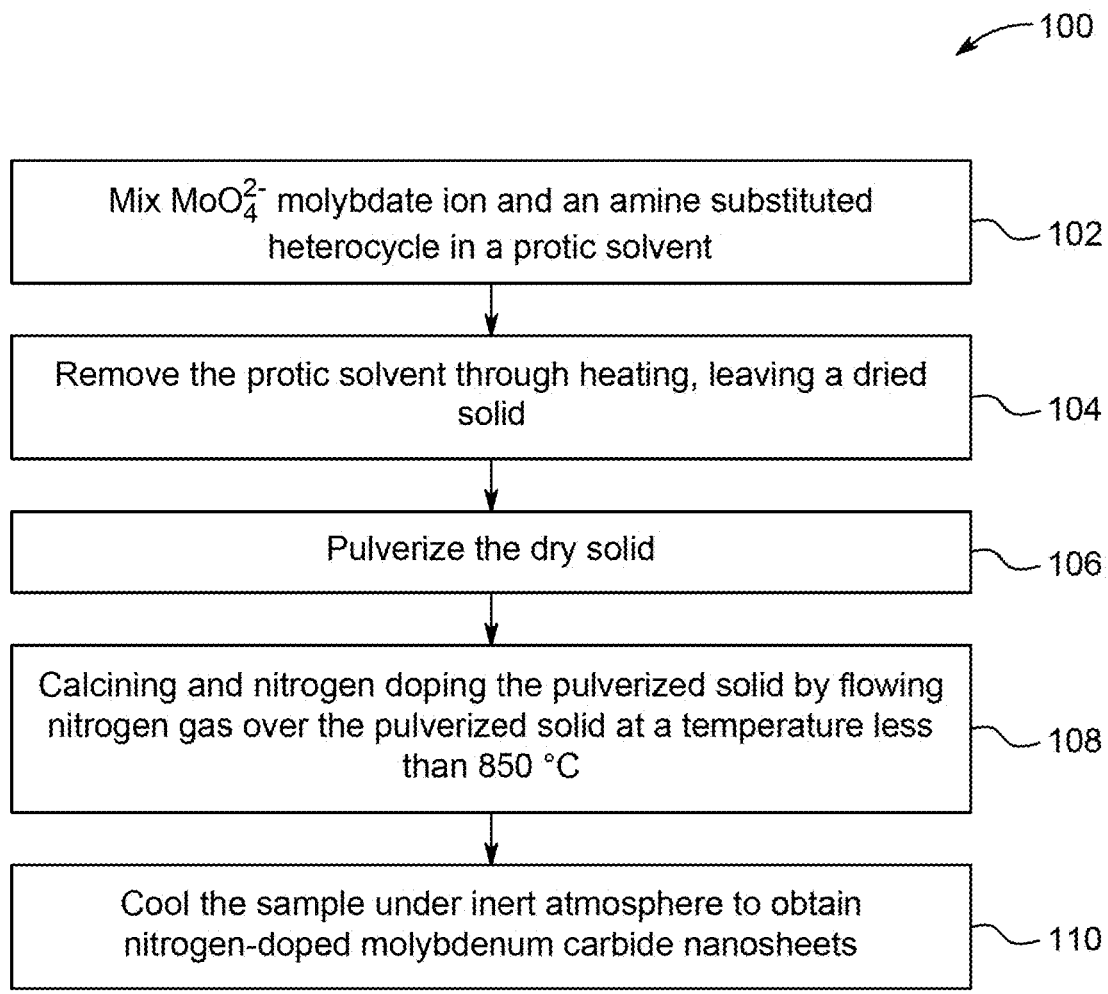
FIG. 1A illustrates a schematic flow diagram of a method of making a nitrogen-doped molybdenum carbide nanosheets $Mo_2C/MoO_3$ (N—MoC), according to certain embodiments.
Figure 1B:
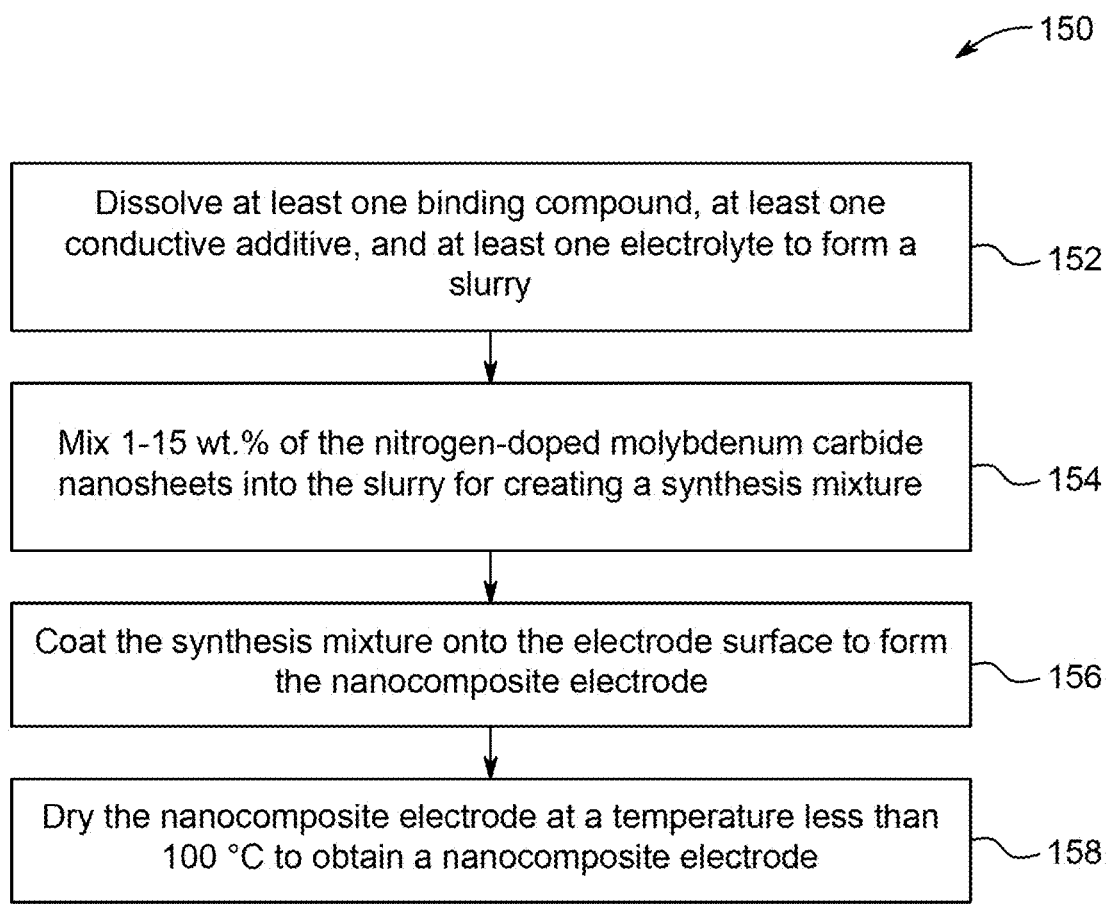
FIG. 1B illustrates a schematic flow diagram of a making a nanocomposite electrode using the nitrogen-doped molybdenum carbide nanosheets, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, "electrode substrate" refers to a substrate including a conducting material, which may be, but is not in any manner limited to, metals, metal alloys, and other conducting materials.

As used herein, "electrolyte" refers to substances that conduct electric current because of dissociation of the electrolyte into positively and negatively charged ions.

As used herein, "binding compound" or "binding agent" or "binder" refers to compounds or substances which holds or draws other materials together to form a cohesive whole mechanically, chemically, by adhesion or cohesion.

As used herein, "conductive additive" refers to substances or compounds or materials which when added to another substance or compound or material of low electrical conductivity, increase the conductivity thereof.

As used herein, the term, "amine substituted heterocycle" refers to chemical compounds containing at least one heterocyclic ring, has atoms of at least two different elements, as well as at least one amine (nitrogen-containing) group.

As used herein, "protic solvent" refers any solvent that contains a labile $H^+$ ion.

As used herein, a "voltammogram" is a graph that can be drawn after an electrochemical experiment. This graph has a typical, recognizable form in which the electron flow (current: I) is measured in Volts against the potential (E).

As used herein, "amount" refers to the level or concentration of one or more reactants, catalysts, present in a reaction mixture.

The use of the singular herein includes the plural (and vice versa) unless specifically stated otherwise.

The use of the terms "include," "includes", "including," "have," "has," or "having," "comprise," "comprises," "comprising" or the like should be generally understood as open-ended and non-limiting unless specifically stated otherwise.

It is understood that the order of steps or order for performing certain actions can be changed so long as the intended result is obtained. Moreover, two or more steps or actions may be conducted simultaneously.

Embodiments of the present disclosure are directed to a multilayer N-doped $Mo_2C/MoO_3$ (N—MoC) nanocomposites or nanocomposites. The nanocomposites of the present disclosure can be used as an electrode material in electrochemical energy storage devices. A simple in situ method including pyrolysis of a mixture containing, for example, ammonium molybdate tetrahydrate and amino triazole, under an inert atmosphere is used to synthesize a nanocomposite electrode or electrode. The nanocomposite electrodes are described according to physical and electrochemical performance. As described herein in certain embodiments the electrodes demonstrate high specific capacitance across a wide operation potential of 0-2 V, opening potential application in a variety of energy storage devices.

FIG. 1A illustrates a method 100 for preparing nitrogen-doped molybdenum carbide nanosheets. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes mixing $MoO_4^{2-}$ molybdate ion and an amine substituted heterocycle in a protic solvent and stirring for at least one hour. Protic solvents have a hydrogen bound to an oxygen, nitrogen, or fluoride such as but not limited to water, methanol, ethanol, acetic acid, butanol, and isopropanol. In one embodiment, $MoO_4^{2-}$ molybdate ion is selected from a group consisting of sodium molybdate, ammonium molybdate, diammonium molybdate, iron (II) molybdate, ferric molybdate, nickel molybdate, cobalt molybdate, manganese molybdate, and hydrates thereof. In one embodiment, the $MoO_4^{2-}$ molybdate ion may be ammonium molybdate tetrahydrate (($NH_4)_6Mo_7O_{24} \cdot 4H_2O$), the amine substituted heterocycle may be amino triazole ($C_2H_4N_4$), and the protic solvent may be ethanol. The weight ratio of the $MoO_4^{2-}$ molybdate ion to amine substituted heterocycle is 1:1, 0.5:1, or 2:1.

At step 104, the method 100 includes removing the protic solvent through heating or evaporation, leaving a dried solid.

At step 106, the method 100 includes pulverizing the dried solid.

At step 108, the method 100 includes calcining and nitrogen doping the pulverized solid by flowing nitrogen gas over the pulverized solid at a temperature less than 850° C. In an embodiment, the calcining of the pulverized solid is in a quartz tube under nitrogen flow of 10-50 cm³/min, preferably 25-35 cm³/min with a temperature ramping at 10-20° C./min. In an embodiment, the pulverized solid is first heated from room temperature to less than 250° C. for at least 2 hours, and then further heated to less than 850° C., preferably less than 750° C. or less than 650° C. but greater than 300° C., preferably greater than 400° C. or 500° C., for at least 6 hours.

At step 110, the method 100 includes cooling the sample under inert atmosphere leaving nitrogen-doped molybdenum carbide nanosheets.

In an embodiment, prior to calcination, the pulverized solid exhibits low crystallinity based on the lack of peaks in the SAED pattern (FIG. 4D) however, upon calcination, the N—MoC exhibits strong, evenly spaced peaks (FIG. 4H) indicating a highly crystalline and regularly spaced structure. In an embodiment, SEM images (FIG. 4E) elucidate a layered sheet structure stacking on top of each other with sharp edges and corners, suggesting a strong crystalline nature with a rough surface. In an embodiment, the nitrogen-doped molybdenum carbide nanosheets have a substantially crystalline structure with a spacing of 3-20 nm between each nanosheet, preferably 6-16 nm, or 8-12 nm. In another embodiment, the nitrogen-doped molybdenum carbide nanosheets have a surface area of 200-320 m$^2$/g, preferably 230-290 m$^2$/g or 260-280 m$^2$/g and a pore size of 3-20 nm, preferably 6-16 nm, or 8-12 nm. The pores of the N—MoC are defined as the channels between each stack of layered nanosheets. The spacing of the pores and the spacing between the nanosheets allows for the electrolyte to disperse throughout the N—MoC material.

In an embodiment, the structure of the multilayer nanosheets results in a high surface area, allowing for more interaction between the electrolyte ions and N—MoC, thereby improving energy storage. This unique structure provides channels allowing the electrolyte to penetrate the N—MoC layers resulting in increased contact surface area. This may bring more active sites on the electrode surface and increase the surface area which is necessary for ion adsorption.

In an embodiment, the N—MoC multilayered nanostructures resulted from the presence of amino triazole. The amino triazole acts as a nitrogen dopant, but also as it decomposes during calcination, nitrogen gas is released, both of which promote the formation of a multilayer material rather than a closely packed structure. In an embodiment, the nitrogen-doped molybdenum carbide nanosheets comprise less than 50 ppm, preferably less than 30 ppm, or no traces of triazole residue following calcination.

In an embodiment, the nitrogen-doped molybdenum carbide nanosheets include $MoO_3$, $Mo_2C$, and $Mo_2N$ phases, wherein the phases are present in relative percentages of 50-80% $MoO_3$, 10-25% $Mo_2C$, and 10-25% $Mo_2N$, preferably 60-70% $MoO_3$, 15-20% $Mo_2C$, and 15-20% $Mo_2N$, or about 70% $MoO_3$, 15% $Mo_2C$, and 15% $Mo_2N$. Nitrogen-doped refers to the presence of nitrogen chemically bound in the structure of the N—MoC. Incorporating nitrogen into the structure may create defects leading to the formation of a multilayer material rather than a closely packed structure. In an embodiment, the N—MoC comprises 1-8 wt % nitrogen, preferably 3-6 wt %, or 4-5 wt % based on the total atomic weights of the Mo, O, C, and N in the N—MoC.

In an embodiment, the $MoO_3$ (020) diffraction peak is 22.0-25.0°, preferably 22.5-24.0°, or 23.0-23.5°, the $MoO_3$ (110) diffraction peak is 24.0-28.0°, preferably 25.0-27.0°, or 25.5-26.5°, the $MoO_3$ (040) diffraction peak is 25.0-29.0, preferably 26.5-28.5°, or 27.0-28.0°, and the $MoO_3$ (021) diffraction peak is 35-41°, preferably 36.5-39.5°, or 38.0-39.0°. In an embodiment, the $Mo_2C$ (002) diffraction peak is 35.0-40.0°, preferably 36.5-38.5°, or 37.5-38.0°, the $Mo_2C$ (101) diffraction peak is 38-41°, preferably 38.5-40.5°, or 39.0-40.0°, the $Mo_2C$ (102) diffraction peak is 50.0-53.5°, preferably 51.0-53.0°, or 52.0-52.5° the $Mo_2C$ (103) diffraction peak is 68.0-72.0°, preferably 69.0-70.5°, or 69.5-70.0°. In an embodiment, the $Mo_2N$ (111) diffraction peak is 35.0-39.0° preferably 36.0-38.0°, or 36.5-37.5°, the $Mo_2N$ (200) diffraction peak is 40.0-44.0°, preferably 41.0-43.5°, 42.0-43.0° and the $Mo_2N$ (220) diffraction peak is 62.0-67.0°, preferably 63.0-66.0°, or 64.0-65.0°.

The nanocomposite electrode comprises nitrogen-doped molybdenum carbide nanosheets, an electrolyte, a binding compound, and a conductive additive. In some embodiments, the electrode substrate is coated with a mixture of the nitrogen-doped molybdenum carbide nanosheets, the electrolyte, the binding compound, and the conductive additive. In an embodiment, the mixture comprises 1-15 wt. %, preferably 3-12 wt. %, 5-10 wt. % or 7-9 wt. % of the nitrogen-doped molybdenum carbide nanosheets, and 85-99 wt. %, preferably 88-97 wt. %, 90-95 wt. % or 91-93 wt. % of at least one electrolyte, at least one conductive additive, and at least one binding compound based on the total weigh of the nitrogen-doped molybdenum carbide nanosheets, the electrolyte, the conductive additive, and the binding compound. In an embodiment the electrolyte at least partially penetrates the pores of the nitrogen-doped molybdenum carbide nanosheets and the nitrogen-doped molybdenum carbide nanosheets form an outer layer on the electrode.

In an embodiment, the mixture coated on the electrode substrate has a contact angle of less than 40°, preferably 30° or less, 20° or less, or 10° or less, indicating the mixture has a strong affinity to wet the substrate surface.

In some embodiments, the conductive additive includes a conductive material and a polymer. The conductive additive allows for improved adhesion between the mixture and the electrode substrate. This intimate connection results in lower electrical resistance and, accordingly, lower impedance for the nanocomposite electrode and its associated device. In one embodiment, the conductive additive is at least one selected from the group consisting of graphite, activated carbon, reduced graphene oxide, carbon nanotubes, carbon nanofibers, and carbon black. In an embodiment, the electrolyte is a polyol compound mixed with at least one selected from the group consisting of alkali metal hydroxides, alkaline earth hydroxides, alkali metal salts, and alkaline earth salts including but not limited to sodium hydroxide, potassium hydroxide, lithium hydroxide, barium hydroxide, calcium hydroxide, sodium chloride, potassium bromide, magnesium chloride to form a gel electrolyte. The polyol compound is a compound containing multiple hydroxyl groups, such as but not limited to glycerol, ethylene glycol, and propylene glycol. In an embodiment, the electrolyte may be a glycerol-KOH gel electrolyte. The KOH is 1-6 M in the glycerol, preferably 2-5 M or 3-4 M. Gel electrolytes compared to solution electrolytes increase the flexibility and elasticity of the electrode and thereby improve the cyclability and allow for use in wearable electronics.

In one embodiment, the binding compound is one or more selected from a group consisting of polyvinylidene fluoride (PVDF)-based polymers, and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In an embodiment, the binding compound is selected from the group consisting of a fluorine containing polymer including polyvinylidene fluoride and N-methyl pyrrolidone (NMP).

Referring to FIG. 18, a method 150 of making a nanocomposite electrode using the nitrogen-doped molybdenum carbide nanosheets is disclosed. The order in which the method 150 is described is not intended to be construed as a limitation, and any number of the described method steps can be combined in any order to implement the method 150. Additionally, individual steps may be removed or skipped from the method 150 without departing from the spirit and scope of the present disclosure.

At step 152, the method comprises includes dissolving at least one binding compound, at least one conductive additive, and at least one electrolyte to form a slurry. In an embodiment, the slurry was obtained by mixing polyvinylidene fluoride (HSV 900 PVDF) binder in a mixture containing a conductive additive and conductive carbon at a particular temperature with constant stirring until homogenous mixture obtained. In one embodiment, the slurry is stirred at a temperature of 70° C. until the slurry is homogeneous.

At step 154, the method 150 further includes mixing 1-15 wt. % of the nitrogen-doped molybdenum carbide nanosheets into the slurry for creating a synthesis mixture. In an embodiment, various concentrations of molybdenum nitride-carbide ($Mo_2N/C$) material are added in the resultant slurry. In an embodiment, the concentration of the molybdenum nitride-carbide ($Mo_2N/C$) material in the resultant slurry may be 1, 5, and 10% (w/w).

At step 156, the method 150 includes coating the synthesis mixture onto the electrode surface to form the nanocomposite electrode. In an embodiment, the resultant slurry, including the binding compound, the at least one conductive additive, nitrogen-doped molybdenum carbide nanosheets, was molded on the electrode substrate. In one embodiment, the electrode substrate may be a aluminum mesh current collector. In an embodiment, the electrode substrate may be a mesh made from one or more of materials such as, stainless steel, aluminum, nickel, copper, platinum, zinc, tungsten, and titanium. In an embodiment, the apertures of the mesh substrates can have a diameter of 0.2 millimeters (mm)-2 mm, preferably 0.5-1.5 mm, or 0.8-1.2 mm, and the thickness of the substrate is no more than 500 µm.

In one embodiment, the coating is performed using an automatic coating machine. In an embodiment, the coating is less than 500 nm, preferably 100-450 nm, 200-400 nm, or 250-350 nm.

At step 158, the method 150 includes drying the nanocomposite electrode at a temperature less than 100° C. In an embodiment, after coating the electrode substrate, the developed electrode is dried in a standard oven at 70° C. Appropriately sized electrodes are then cut from dried electrode sheet. In accordance with one embodiment, a precision pneumatic disk cutter may be used to cut and obtain, from the electrode sheet, electrodes corresponding to a die size of the precision pneumatic disk cutter. In an embodiment, the supercapacitors have a length of 1-6 cm, preferably 2-5 cm, 3-4 cm, and a width of 1-6 cm, preferably 2-5 cm, 3-4 cm.

The present disclosure also provides a process for preparing an electrolyte for use in a supercapacitor device. The electrolyte may be a polyol/glycerol-KOH gel electrolyte. The glycerol-KOH gel was synthesized by dissolving calculated amounts of KOH in glycerol to obtain various concentrations of KOH (1M, 3M and 5M). The solutions were stirred at 50° C. leading to final uniform clear mixtures. The mixtures (glycerol-KOH electrolytes) were further dried in vacuum to remove free water.

Embodiments of the present disclosure also relate to a supercapacitor device including the nanocomposite electrode and an electrolyte. In an embodiment, the supercapacitor device comprises two symmetrically facing nanocomposite electrodes. The electrode substrate of each nanocomposite electrodes is coated with the mixture on an inside facing surface and the outer surfaces of the nanocomposite electrodes are not coated with the mixture. The inner nitrogen-doped molybdenum carbide nanosheets layers are separated by the electrolyte. In an embodiment, the supercapacitor device has a power density of 2.2-2.7 W/kg, preferably 2.3-2.6 W/kg, or 2.4 to 2.5 W/kg and an energy density of 15-50 Wh/kg, preferably 25-45 Wh/kg, or 35-40 Wh/kg. In an embodiment, the supercapacitor device has a specific capacitance of 200-350 F/g at 0.5 A/g, preferably 250-340 F/g at 0.5 A/g, or 300-330 F/g at 0.5 A/g.

Figure 7A:
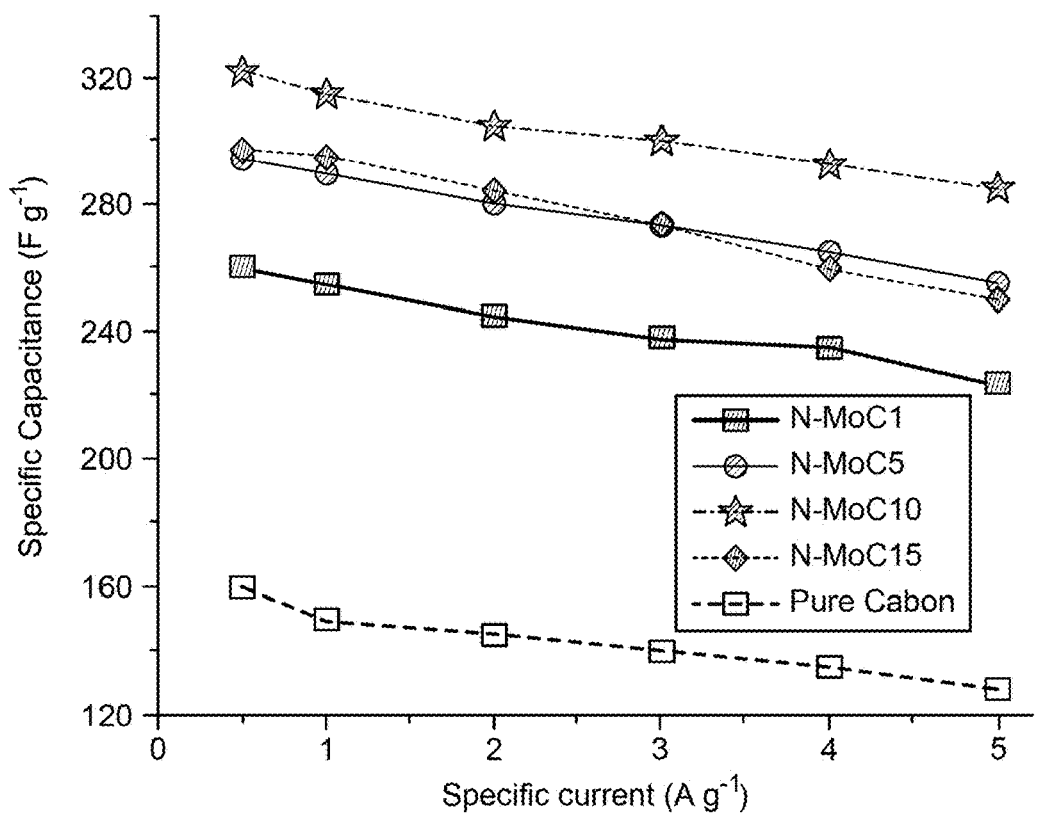
FIG. 7A illustrates specific capacitance of pure carbon, N—MoC1, N—MoC5, N—MoC10 and N—MoC15 at different specific current values, according to certain embodiments.
Figure 7B:
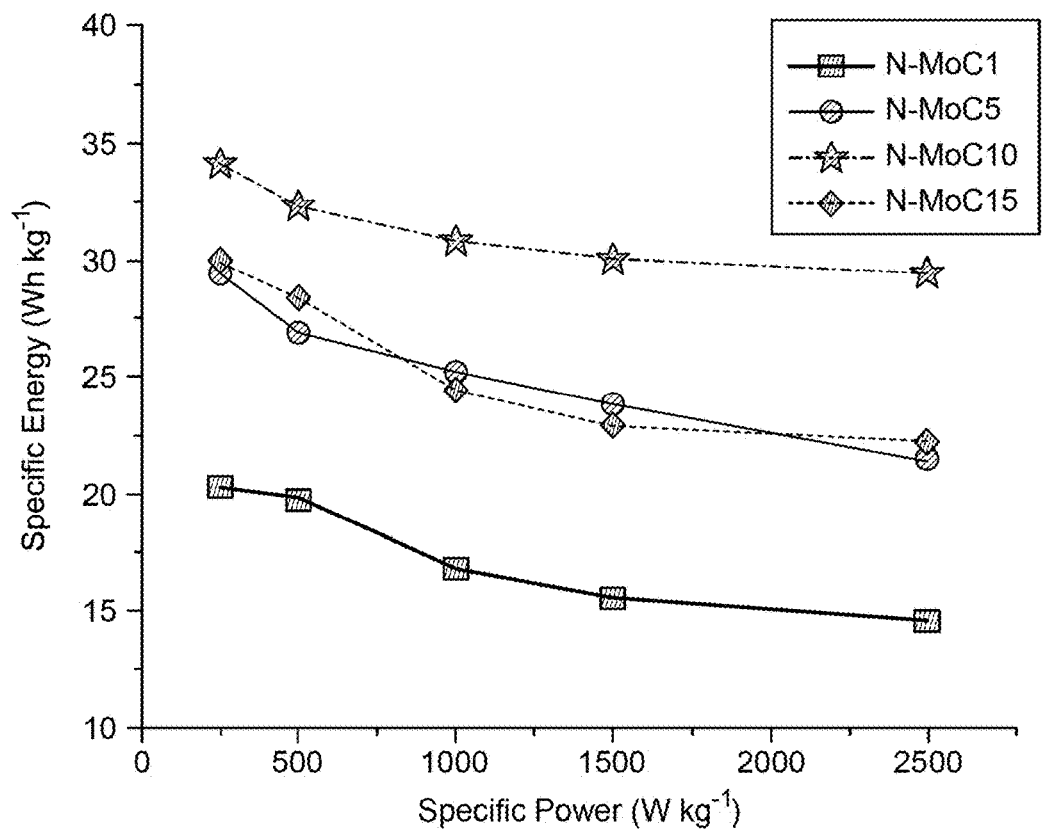
FIG. 7B is a Ragone plot of pure carbon, N—MoC1, N—MoC5, N—MoC10 and N—MoC15, according to certain embodiments.
Figure 7C:
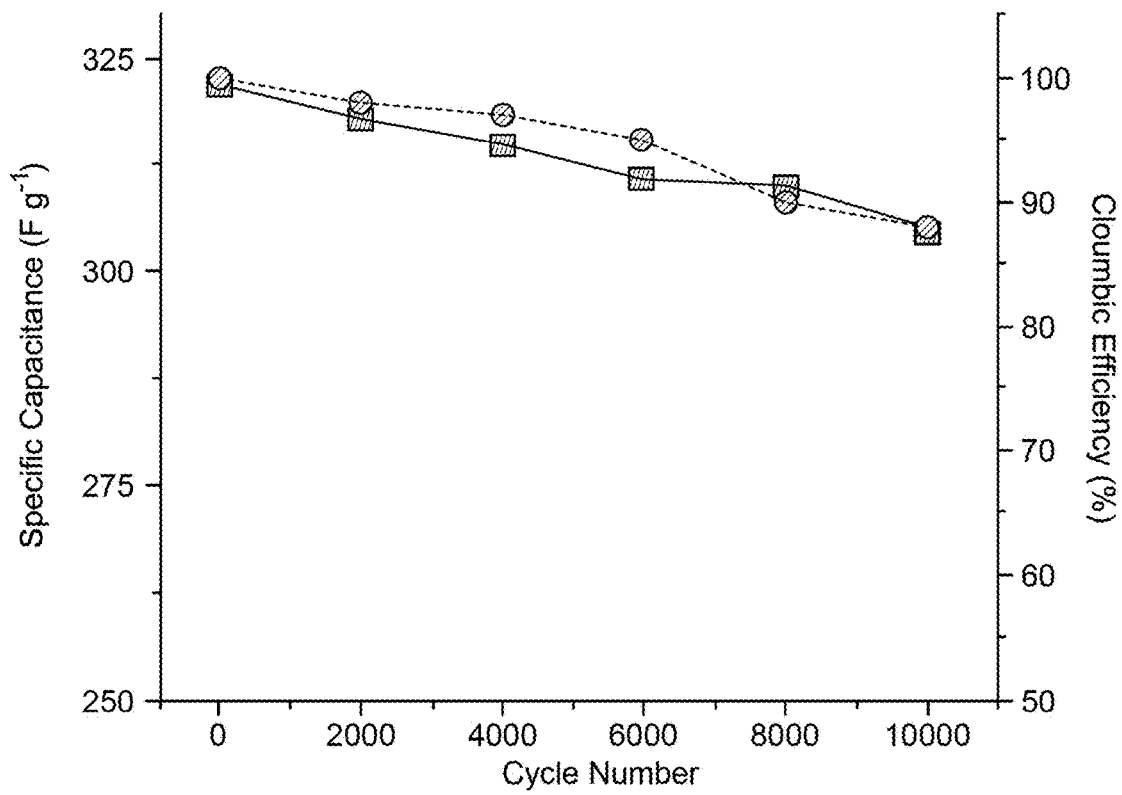
FIG. 7C illustrates cyclic performance of MoC10-based device at 0.5 mA charge-discharge current, according to certain embodiments.
Figure 7D:
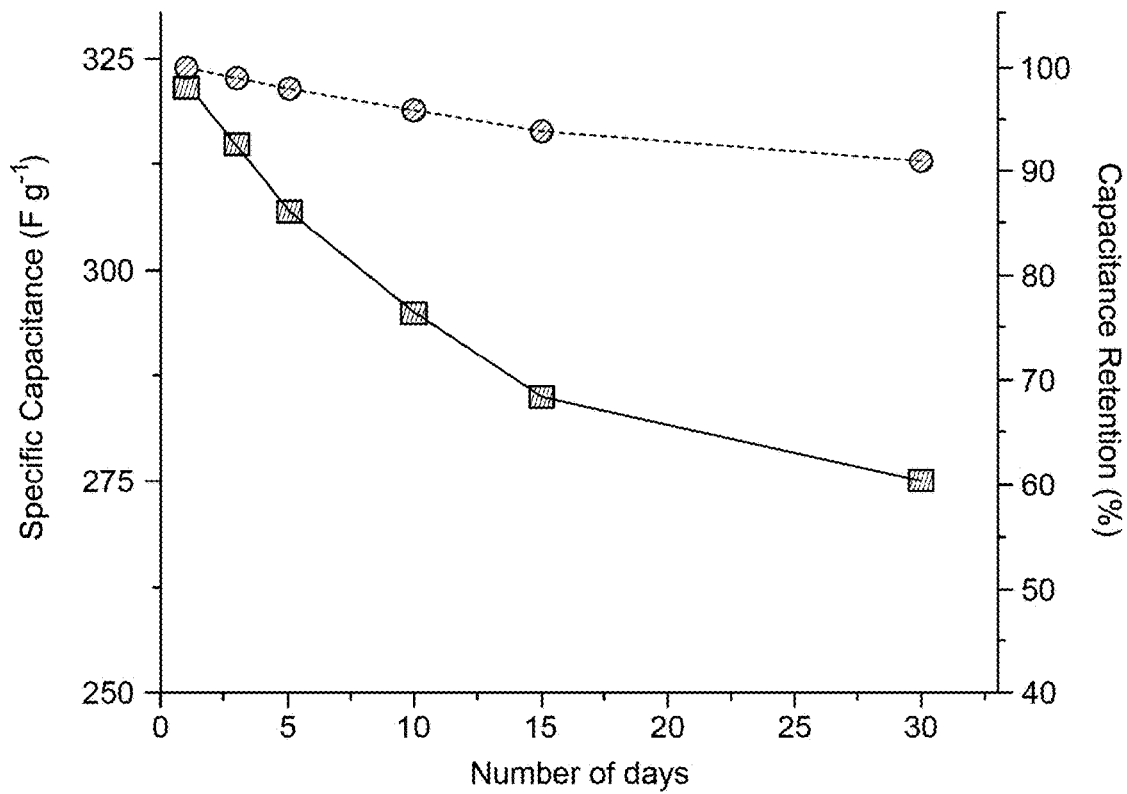
FIG. 7D illustrates columbic efficiency of N—MoC10 at different days, according to certain embodiments.
Figure 7E:
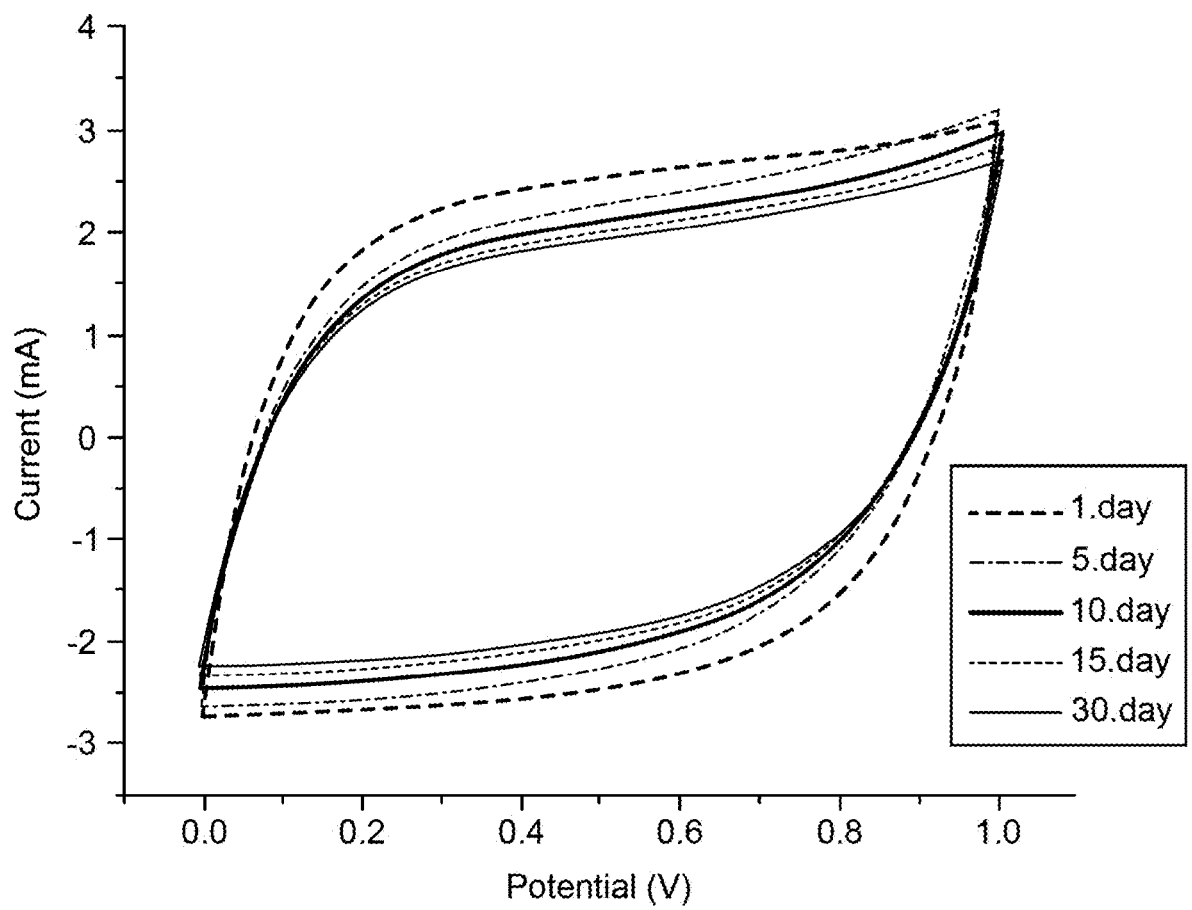
FIG. 7E illustrates CV of N—MoC10 obtained at different days, according to certain embodiments.
Figure 7F:
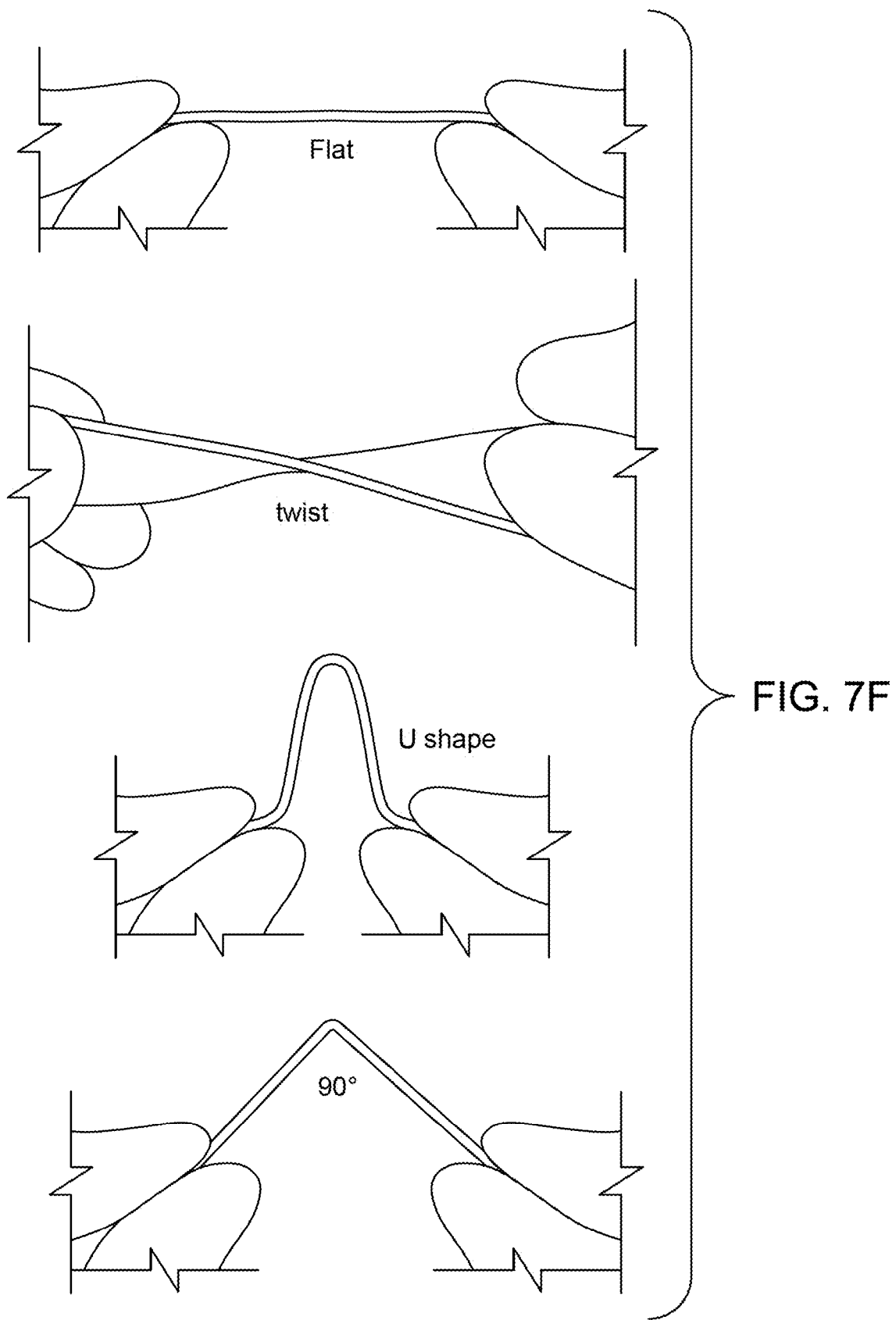
FIG. 7F illustrates real images of the supercapacitor device at different status, according to certain embodiments.

In an embodiment, the supercapacitor is flexible and can be bent at 90°, bent into a U-shape, and twisted (FIG. 7F).

In an embodiment, the supercapacitor device in which at least 85% of the initial capacitance is maintained after 30 days in ambient conditions. In an embodiment, the supercapacitor device includes 2-10, preferably 3-9, 4-8, or 5-7 of the nanocomposite electrodes connected in parallel and/or series. In an embodiment, the supercapacitor device has an equivalent series resistance of 3-15 Ohm (Ω), preferably 5-10Ω, or 7-8Ω. In another embodiment, the nanocomposite electrode is electrically connected a wearable electronic device.

EXAMPLES

The following examples describe and demonstrate a nanoelectrode composite, and the method for making a nanoelectrode composite, and exemplary embodiments of the synthesis of nitrogen-doped molybdenum carbide nanosheets described herein. The examples are provided solely for the purpose of illustration and are not to be construed as limitations of the present disclosure, as many variations thereof are possible without departing from the spirit and scope of the present disclosure.

Example 1: Materials and Methods

Ammonium molybdate tetrahydrate (($NH_4$)$_6$$Mo_7O_{24}$·$4H_2O$), amino triazole or ($C_2H_4N_4$), glycerol ($C_3H_8O_3$) and potassium hydroxide (KOH) pellets were procured from Sigma Aldrich whereas NMP was purchased from Merck. Other materials i.e., 2-Kuraray™ active carbon, polyvinylidene fluoride (HSV 900 PVDF) binder, Timical super C65™ (conductive additive) and conductive carbon were provided by MT1 corporation. Deionized (DI) water was utilized for synthesis of materials throughout the experiment.

Figure 2A:
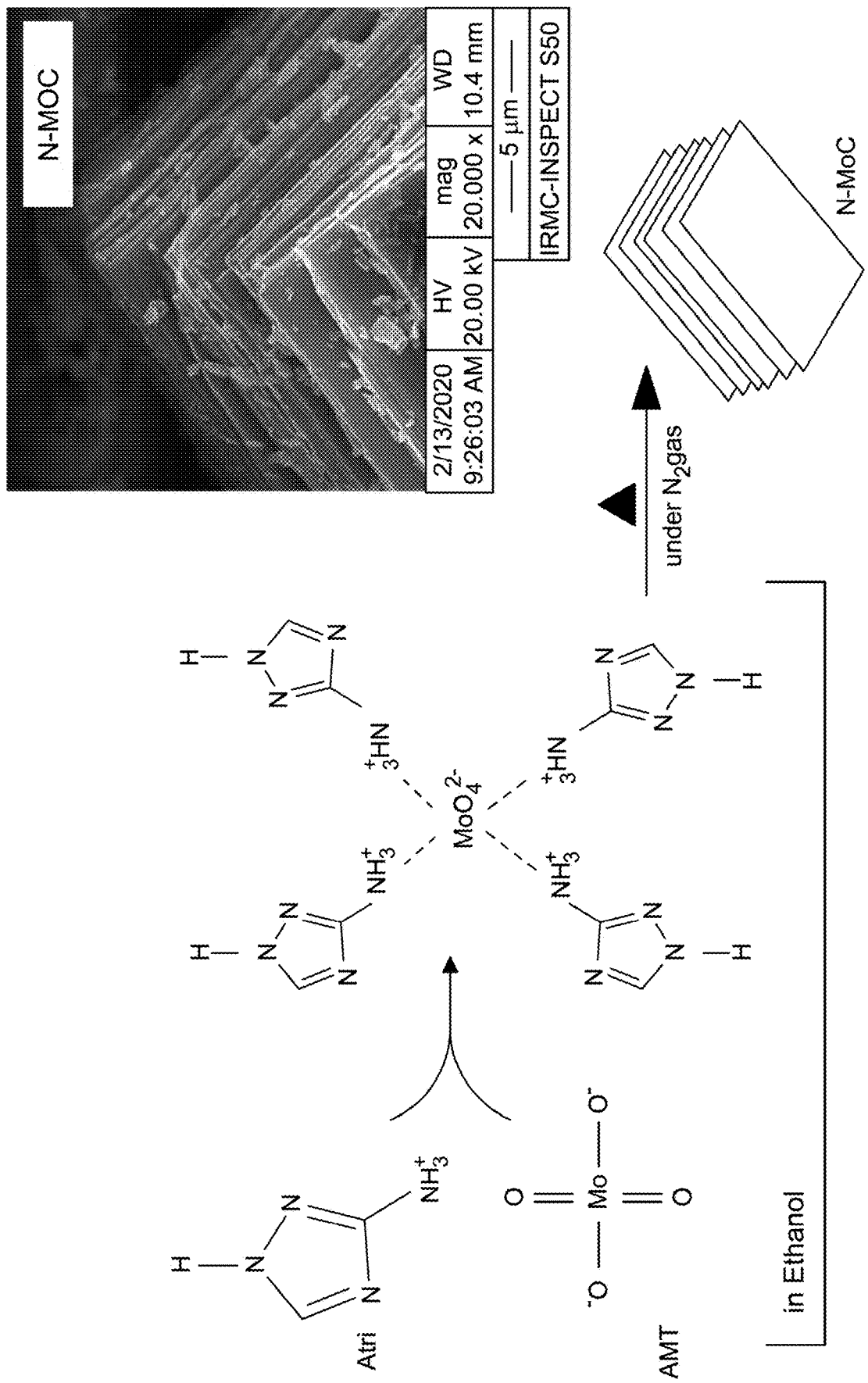
FIG. 2A is schematic illustration of making the nitrogen-doped molybdenum carbide nanosheets, according to certain embodiments.

Example 2: Process for Preparation of the Nitrogen-Doped Molybdenum Carbide Nanosheets Ammonium molybdate tetrahydrate (($NH_4$)$_6$$Mo_7O_{24}$·$4H_2O$) (hereinafter also referred to as AMT) and amino triazole ($C_2H_4N_4$)(hereinafter also referred to as ATri) were used to prepare the nitrogen-doped molybdenum carbide nanosheets. Referring to FIG. 2A, an ethanolic solution of AMT and an ethanol solution of ATri were prepared. The ATri-ethanol solution was added to the AMT-ethanol solution under stirring (magnetic stirring) at room temperature. Three precursors with weight fractions AMT/ATri: 0.5, 1 and 2 were prepared, herein referred to as samples, and the samples were homogenized for a period of 1 hour. The samples were then placed in a standard oven at temperature 80° C. to dry the samples completely. The dried solid cakes of the samples were then pulverized with an agate mortar for calcination process.

In the calcination process, the three pulverized precursors were thermally treated in quartz tube under nitrogen flow (30 $cm^3$/min) with a temperature ramping at 10° C./min. The temperature was then increased in two steps. Firstly, the three pulverized precursors are heated from room temperature to 250° C. for 2 hours and then further heated to 800° C. for 6 hours. After the heating, the three pulverized thermally treated precursors are cooled down under inert atmosphere, and subsequent to the cooling, the three pulverized thermally treated precursors were collected as foam in gray color. These are nitrogen-doped molybdenum carbide nanosheets. The nitrogen-doped molybdenum carbide nanosheets have a substantially crystalline structure with a spacing of 5-15 nm between each nanosheet. In an embodiment, the nitrogen-doped molybdenum carbide nanosheets have a surface area of 250-300 m$^2$/g, and a pore size of 5-15 nm. In accordance with an embodiment, the nitrogen-doped molybdenum carbide nanosheets comprise $MoO_3$, $Mo_2C$, and $Mo_2N$ phases.

Experimental

Instrumentation and Experimental Conditions

FT-IR analysis of the synthesized electrode was conducted to analyze the presence of various functional groups, using Perkin Elmer Fourier-transform infrared (FT-IR) spectrophotometer spectrum. Two™ within the wavelength range (4000-400 cm$^{-1}$), at resolution (4 cm$^{-1}$). Thermal stability of electrode was analyzed through thermogravimetry (TG) measurements (carried out using PerkinElmer Pyris 1 TG Analyzer). Heating was provided to samples under inert atmospheric conditions from ambient temperature to 750° C., at 10° C./minute. Differential scanning calorimetry (DSC) analysis was performed under inert atmospheric conditions at a heating rate of 10° C./minute using Hitachi DSC 7000X instrument. The surface morphology of the electrode was studied through scanning electron microscopy (SEM) (FEI, inspect S50). Elemental analysis and chemical composition of the prepared materials were carried out using SEM equipped with energy dispersive X-rays (EDX) spectroscopy. The detailed morphology and structure of the N—MoC before and after calcination was studied by transmission electron microscopy (TEM) and electron diffraction (FEI, Morgagni 268 at 80 kV). To show representative features of the specimens, the images at two magnifications are displayed for TEM along with selected area electron diffraction (SAED) patterns.

Following configuration was selected for supercapacitor devices: AL/N-MoC/glycerol-KOH/N-MoC/AL. For electrochemical analysis, cyclic voltammetry (CV) as well as galvanostatic charge-discharge (GCD) were performed on fabricated supercapacitor devices. GCD studies were conducted at current densities (0.5-5 Ag$^{-1}$) with a cut off voltage range of 0-1.5 V, using an MTI Battery Analyzer whereas an electrochemical analyzer (Palmsens Emstat5) was used to study CV measurements at scan rates (5 to 70 mV s$^{-1}$).

Figure 2B:
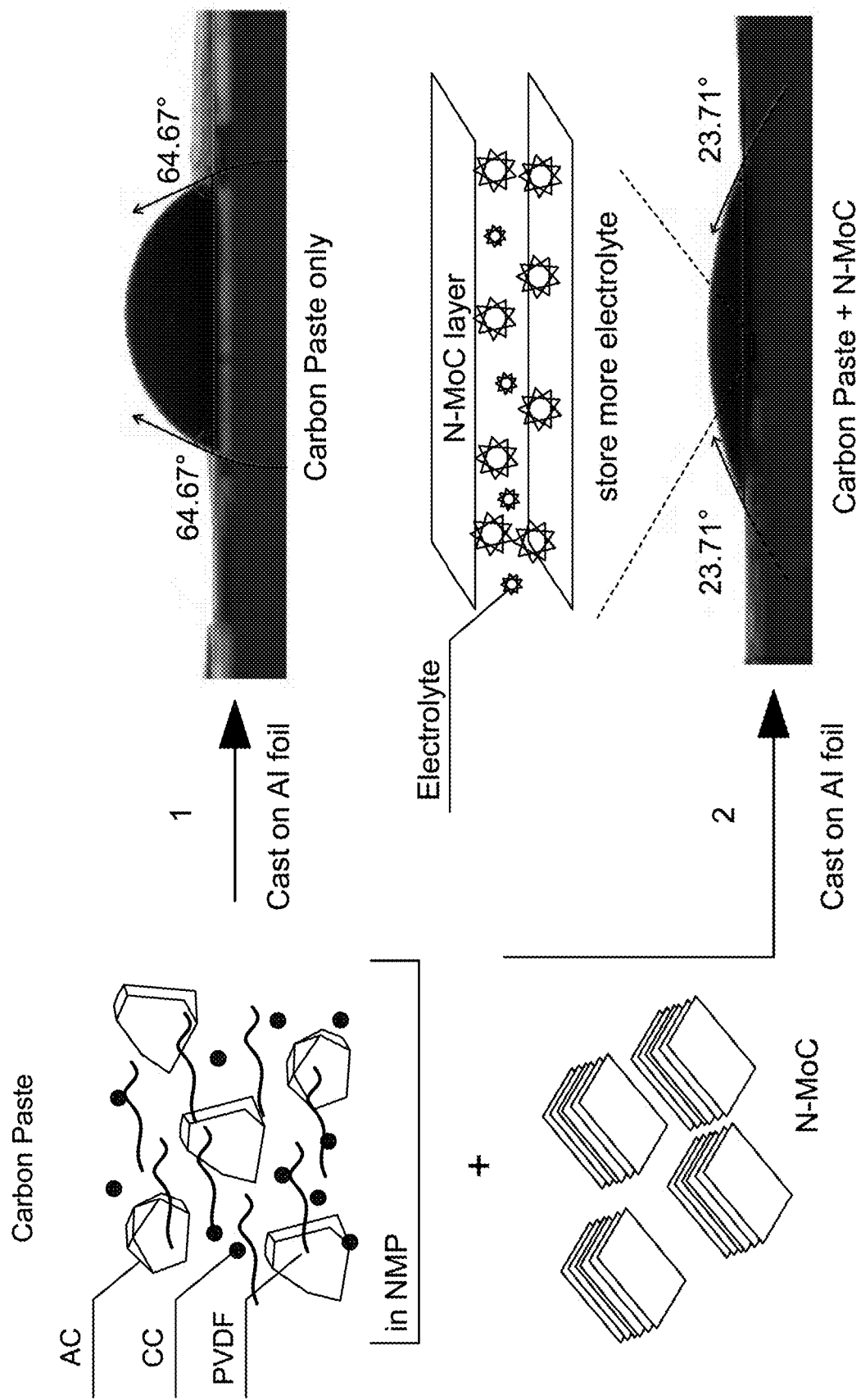
FIG. 2B is schematic illustration of electrode preparation with N-doped $Mo_2C/MoO_3$ (N—MoC) nanocomposites, according to certain embodiments.

Referring to FIG. 2B, electrochemical reactions in supercapacitors occur with the reaction of positively and negatively charged ions (formation of double-layer structure) occurring between the electrode and the electrolyte. The more surface area of the electrolyte by penetrating the pores on the electrode surface, supports the formation of a more double-layer structure and increases the output capacitance. As seen in FIG. 2B, the electrode is obtained by coating a carbon paste obtained with a mixture of AC-CC and PVDF onto an aluminum foil (route 1). The contact angle was measured with carbon coated electrodes and thus the ability of the electrode to absorb (or store) the electrolyte was investigated. In addition, N—MoC nano structure was added to the same carbon paste (a homogeneous paste formation was observed) and the same coating was applied on aluminum foil (route 2). The contact angle of the N—MoC modified carbon composite electrodes was measured. Contact angle measurements with both electrodes show that the electrode modified with N—MoC shows a much lower contact angle, suggesting more electrolyte is stored. This can be explained by the multilayer structure of N—MoC and the different functional groups, increasing the hydrophilic property of the electrode material.

Figure 3A:
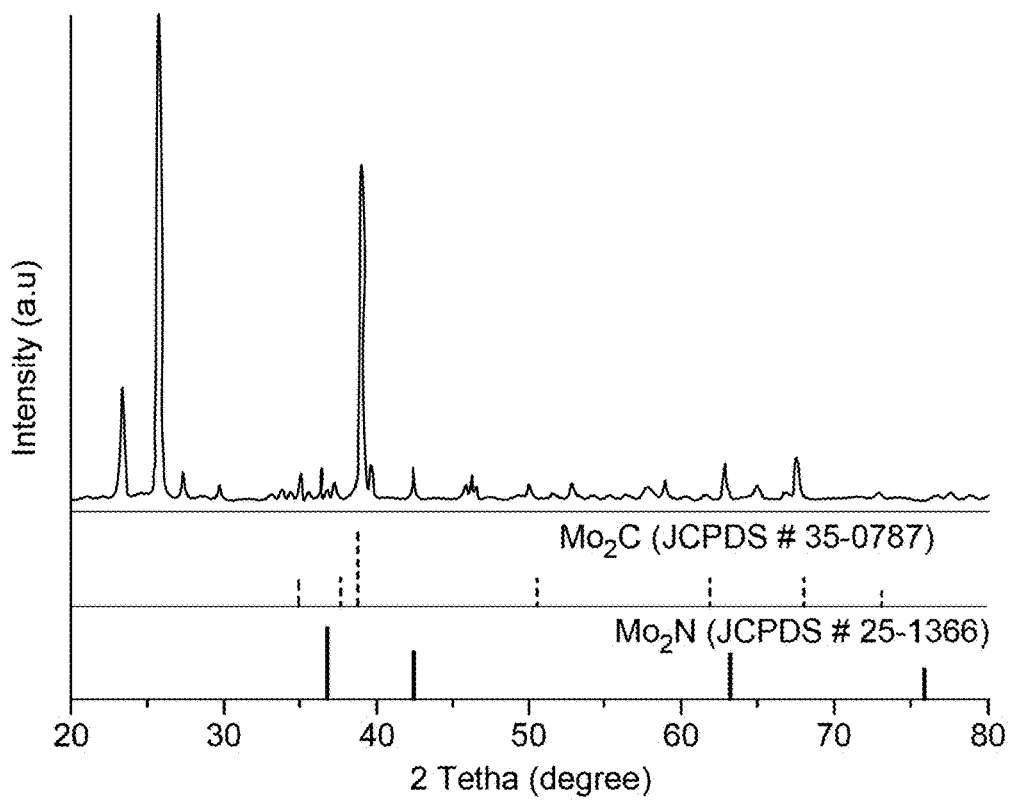
FIG. 3A illustrates X-ray diffraction (XRD) image of the nitrogen-doped molybdenum carbide nanosheets, according to certain embodiments.

The X-ray diffraction (XRD) analysis was used to examine the phases of the as-synthesized multilayer nanocomposite of MoN as shown in FIG. 3A. The XRD pattern of the sample provides peaks between 20° to 80° which can be assigned to monoclinic $MoO_3$ with $Mo_2C$ and $Mo_2N$ phases (JCPDS No: 05-0508, JCPDS No: 35-0787 and JCPDS No: 25-1366). The existence of the $MoO_3$ planes (020), (110), (040), (021), and (060) are confirmed by the diffraction peaks located at 2θ of 23.2°, 26°, 27.5°, and 38.5°, respectively. Similarly, corresponding peaks located at 2θ of 37.7°, 39.4°, 52.1° and 69.6° are assigned to (002), (101), (102) and (103), indicating the planes of $Mo_2C$ as reported in the literature. The presence of the $Mo_2N$ phase was observed from the 2θ peaks at 37°, 42.5° and 64.5° at the corresponding planes of (111), (200) and (220), respectively (no data provided in the figures).

Figure 3B:
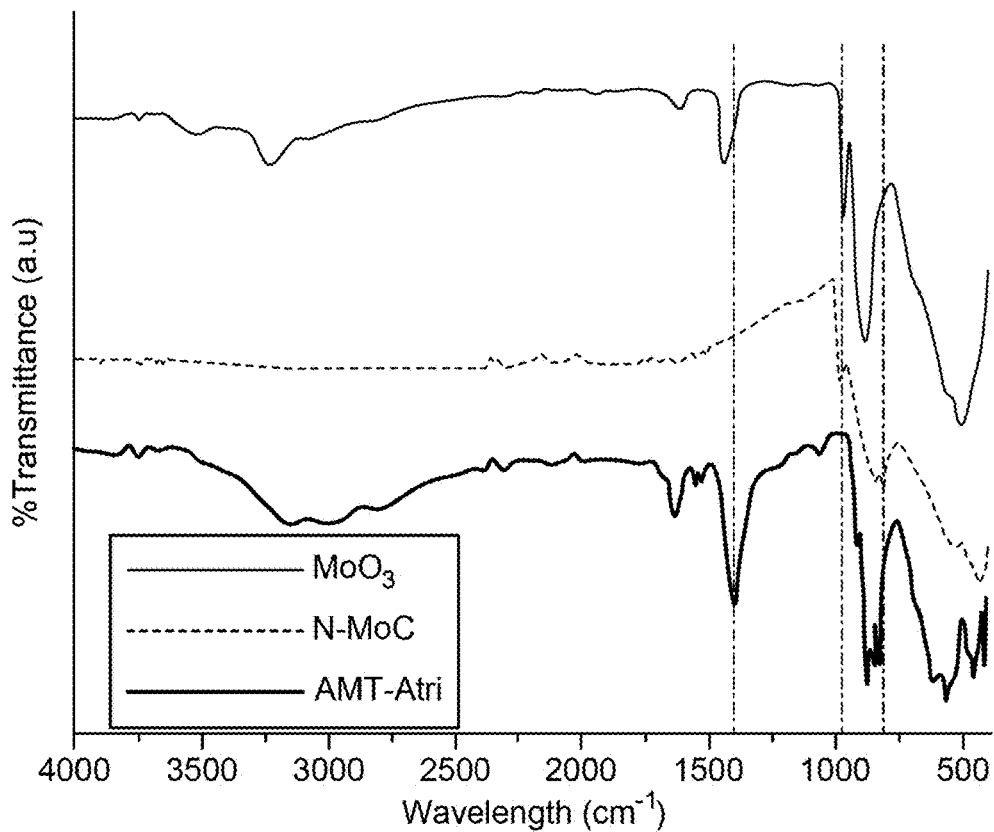
FIG. 3B shows Fourier Transform infrared (FT-IR) spectra of $MoO_3$, calcinated N—MoC, and uncalcinated ammonium molybdate tetrahydrate $((NH_4)_6Mo_7O_{24}·4H_2O)$ (hereinafter also referred to as AMT)-amino triazole $(C_2H_4N_4)$ (hereinafter also referred to as ATri) nanostructures, according to certain embodiments.

FIG. 3B shows the FT-IR spectrum of the uncalcinated sample containing ammonium molybdate and amino triazole. The Mo—O stretching and bending of the Mo—O—Mo bonds are seen at 620, 880 and 990 cm$^{-1}$, respectively. The peak at 1580 cm$^{-1}$ belongs to ring stretching of azole group. The bands at 3400-2800 cm$^{-1}$ depict N—H stretching of both amine and ammonium groups as well as hydroxyl groups material. After calcination, the Mo═O stretching vibration is located at 980 cm$^{-1}$ and the vibrations of Mo—O are observed between 750 and 500 cm$^{-1}$. In addition, the spectrum indicates the layered orthorhombic $MoO_3$ phase at 867 cm$^{-1}$ due to stretching mode of Mo—O—Mo bonds, and a broadening at 550 cm$^{-1}$ for bending vibrations of Mo—O.

Figure 3C:
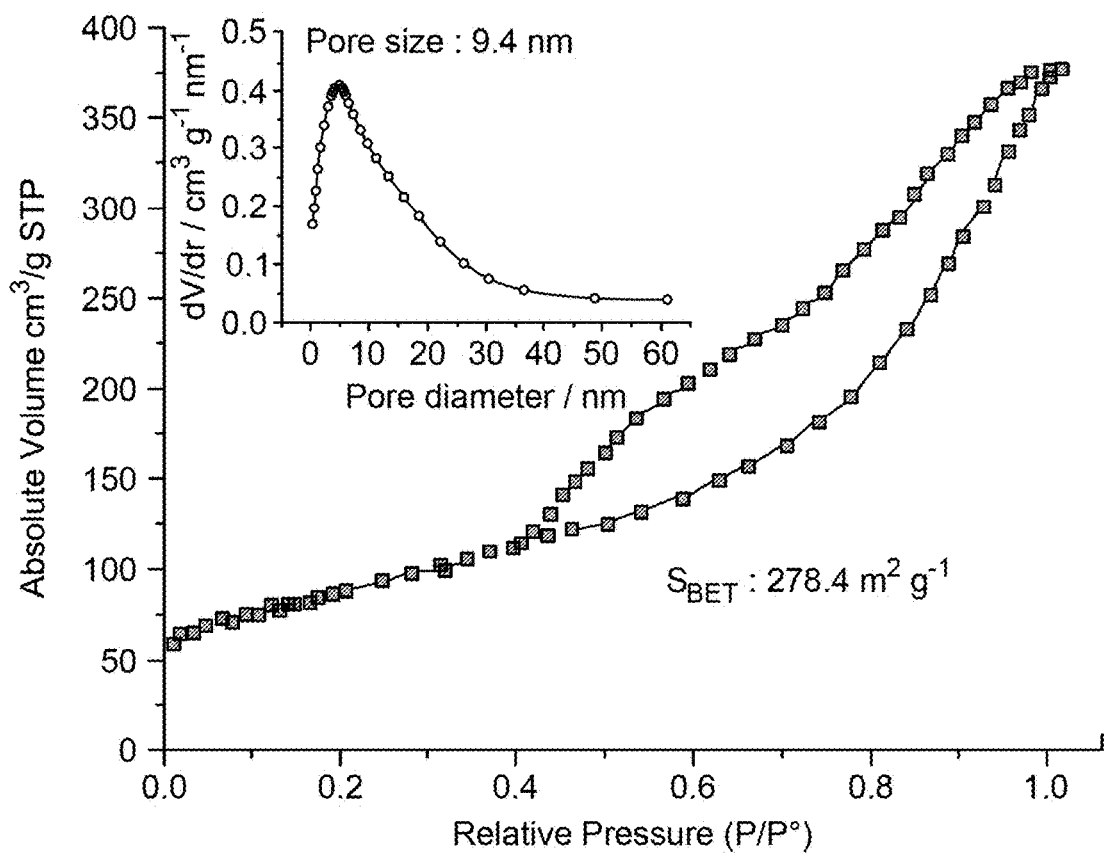
FIG. 3C shows Brunauer-Emmett-Teller (BET) analysis of the N—MoC, according to certain embodiments.

The $N_2$ adsorption-desorption isotherm studies were carried out to observe the pore diameter and specific surface area distributions of the material. The surface area for N—MoC was calculated using Brunauer-Emmett-Teller (BET) as 278.4 square meter per gram (m$^2$ g$^{-1}$) and the pore size was measured as 9.4 nm as illustrated in FIG. 3C.

Figure 3D:
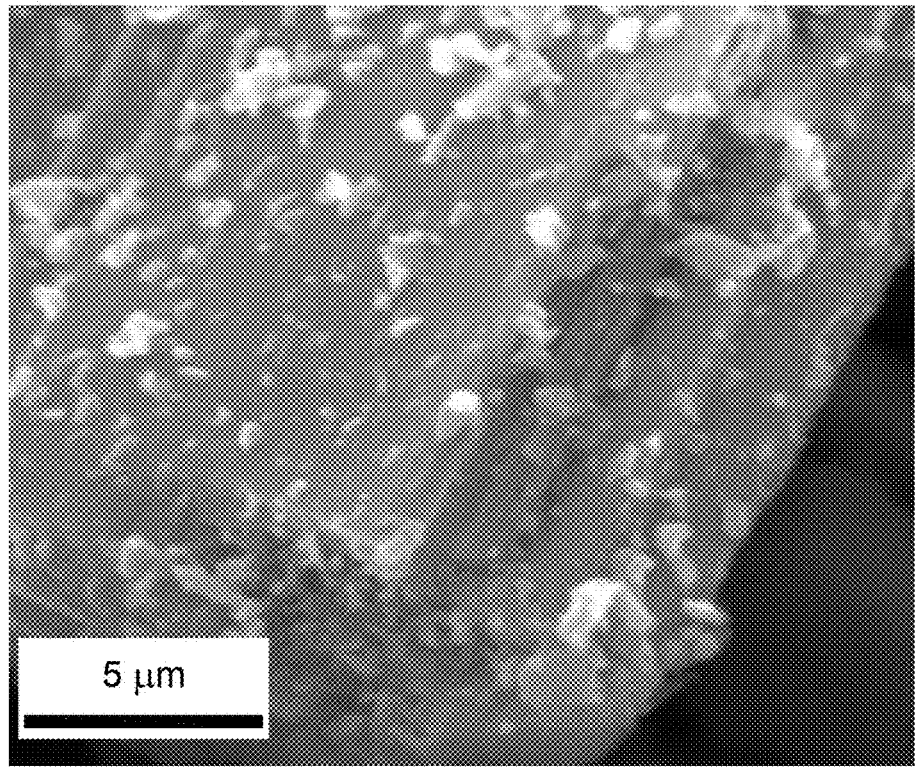
FIG. 3D shows scanning electron microscope (SEM) image of N—MoC, according to certain embodiments.
Figure 3E:
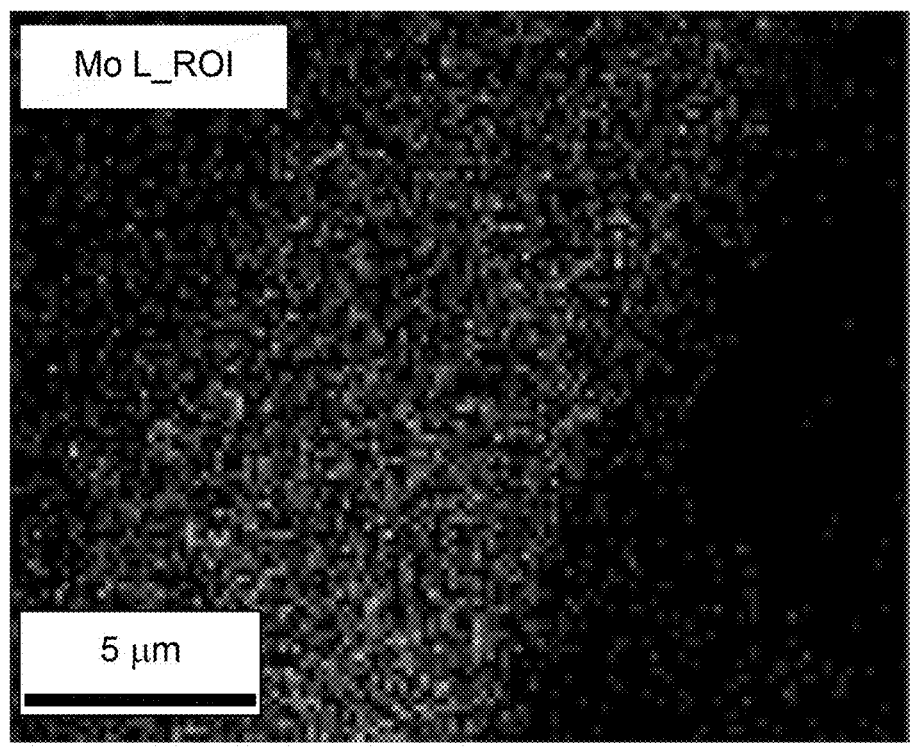
FIG. 3E to FIG. 3H show elemental mapping images of Mo, O, C and N, respectively, according to certain embodiments.
Figure 3F:
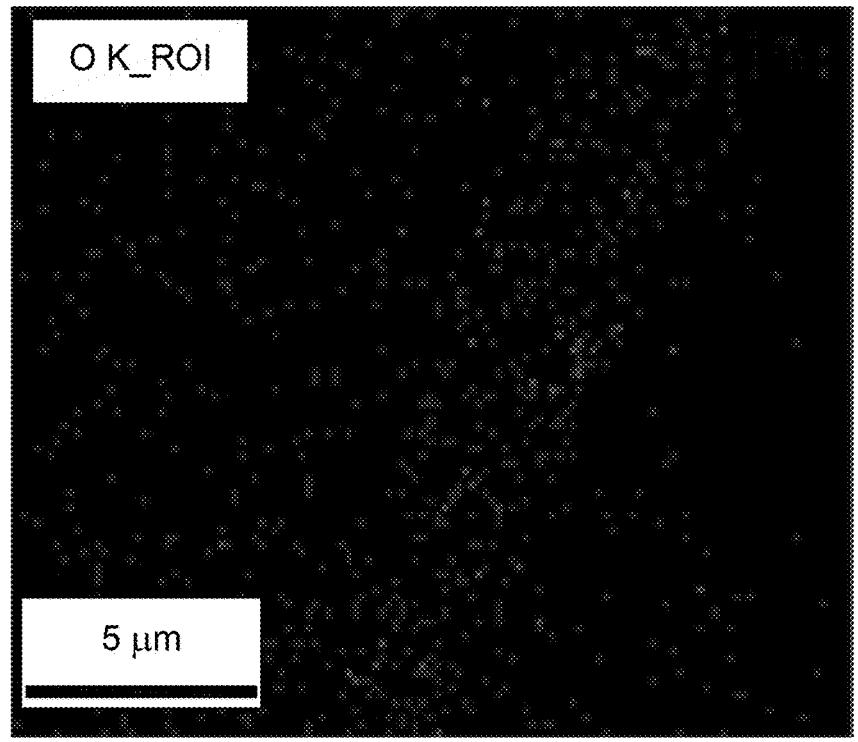
Figure 3G:
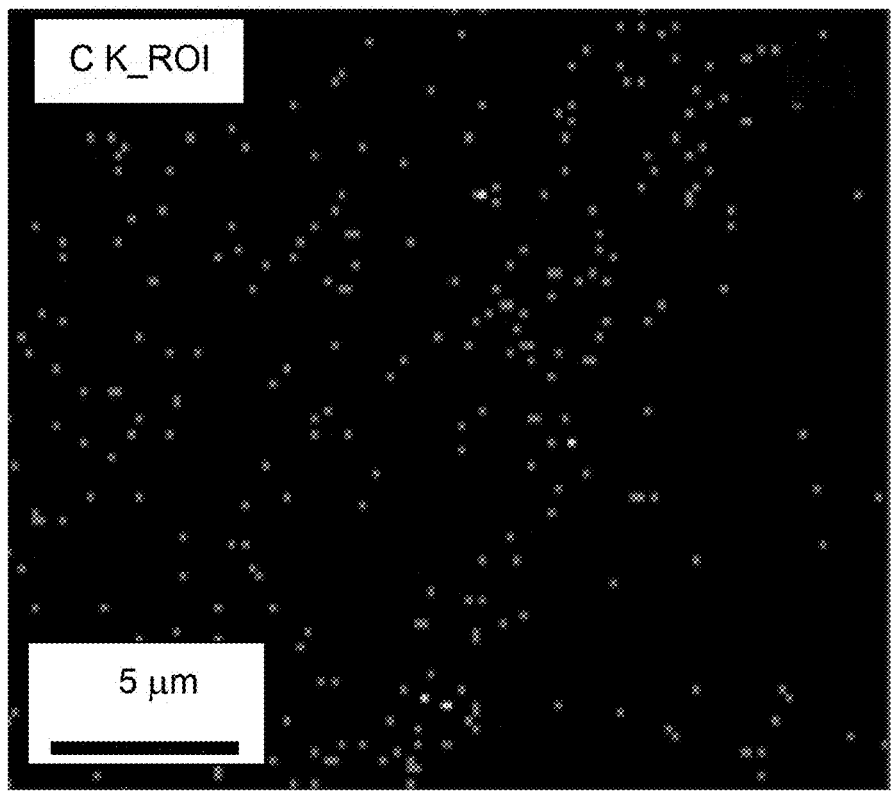
Figure 3H:
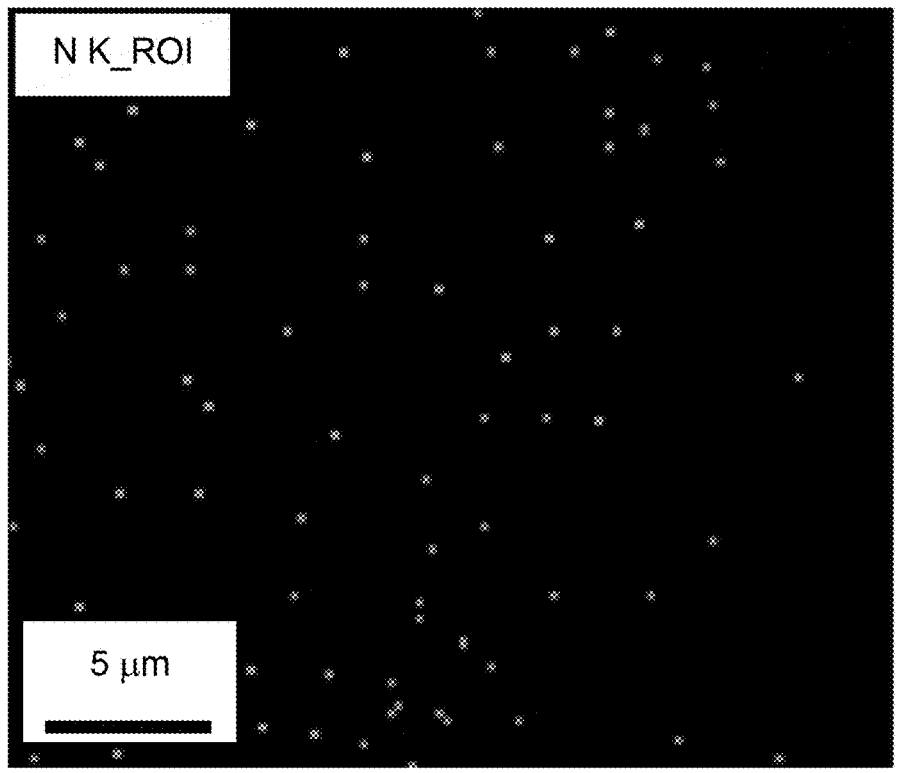
Figure 3I:
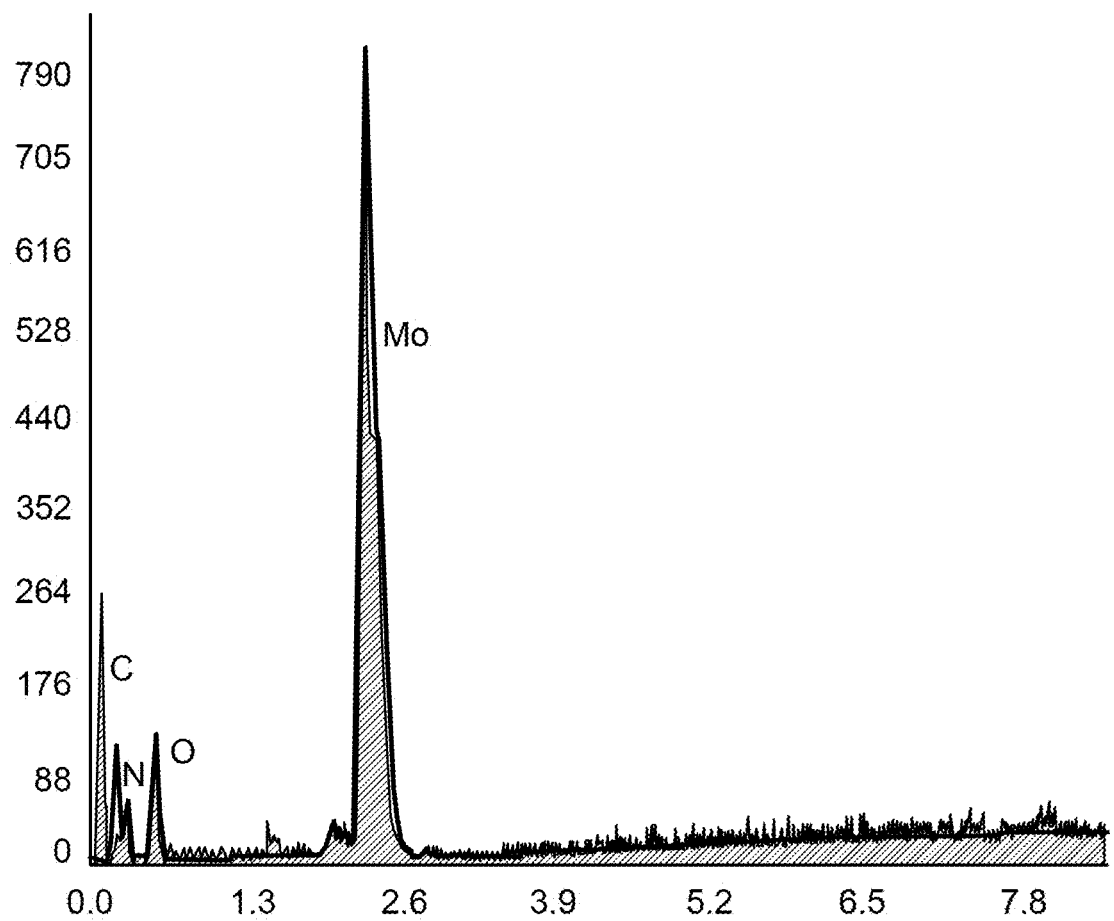
FIG. 3I shows Energy-dispersive X-ray spectroscopy (EDX) spectra of N—MoC, according to certain embodiments.

As detected from SEM image in FIG. 3D, the calcinated product inherited the morphology of $MoO_3$ platelets with a rough surface. FIG. 3E-I illustrates the elemental mapping images of Mo, O, C and N and EDX-mapping images of as-prepared N—MoC samples indicating that the Mo, C, N, and O elements are uniformly dispersed throughout the whole material, suggesting the successful production of N-doped $Mo_2C/MoO_3$ nanocomposite.

Figure 4A:
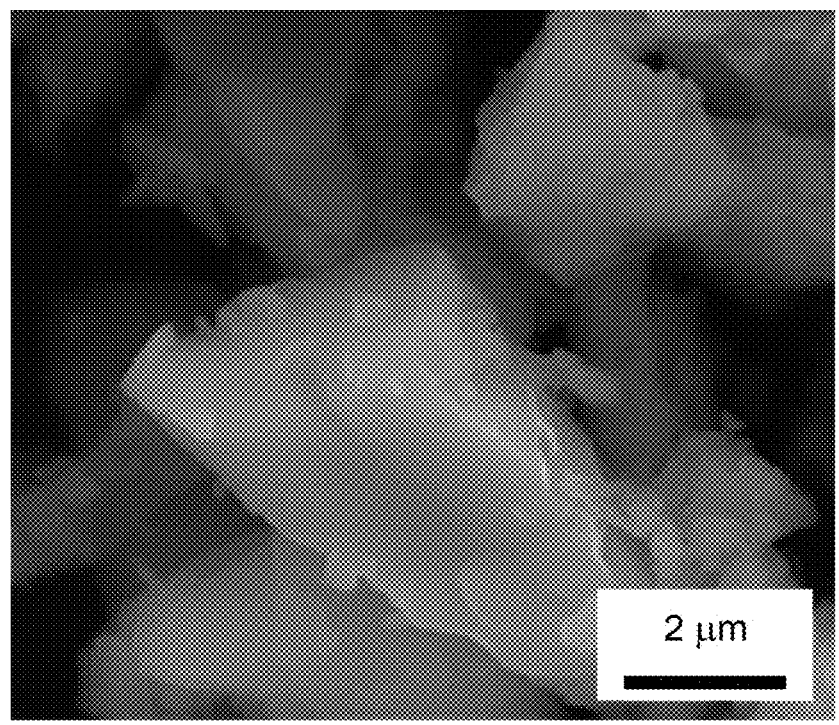
FIG. 4A illustrates SEM images of uncalcinated AMT-Atri, according to certain embodiments.
Figure 4B:
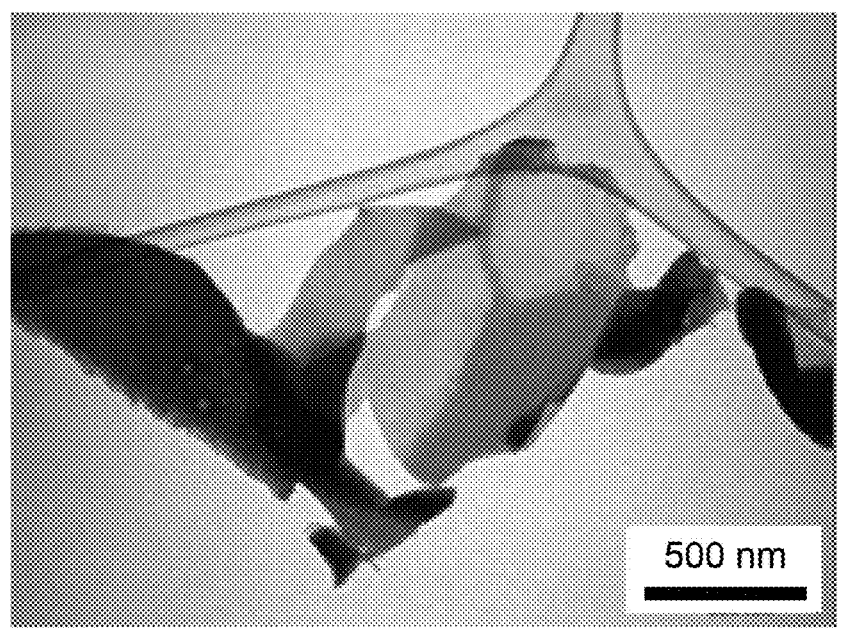
FIG. 4B and FIG. 4C illustrate transmission electron microscopic (TEM) images of uncalcinated AMT-Atri, at low resolution, according to certain embodiments.
Figure 4C:
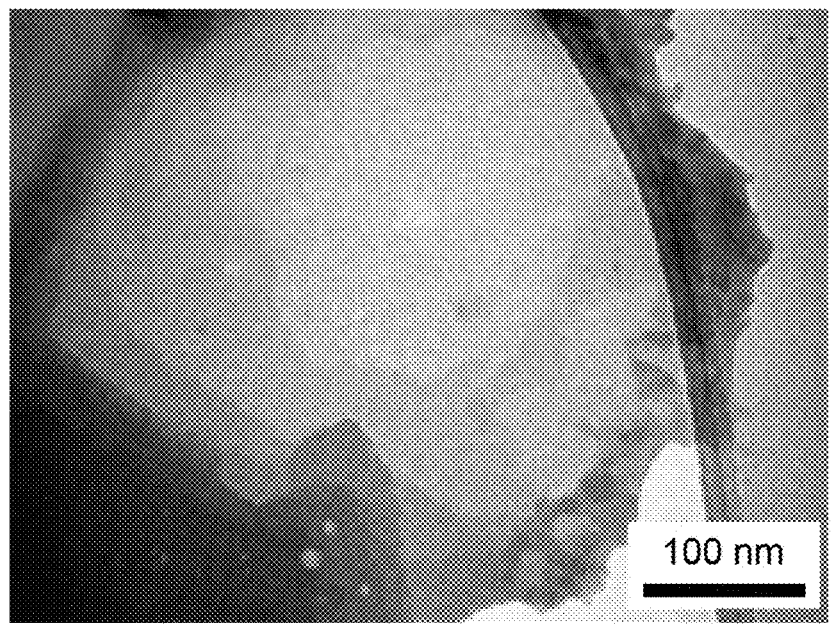
Figure 4D:
FIG. 4D illustrates selected area (electron) diffraction (SAED) patterns of uncalcined N—MoC, according to certain embodiments.
Figure 4E:
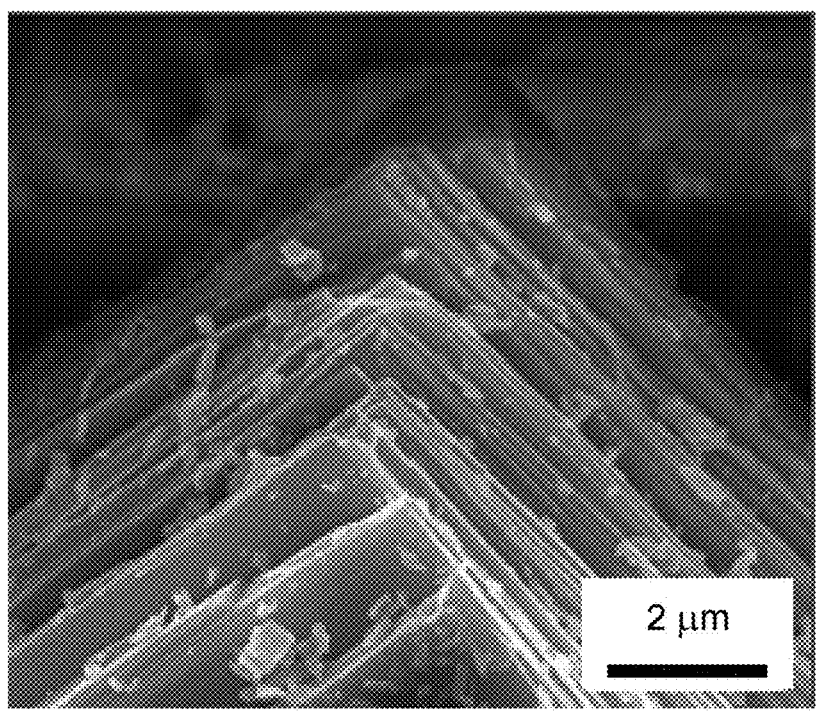
FIG. 4E illustrates SEM images of calcinated N-Moc, according to certain embodiments.
Figure 4F:
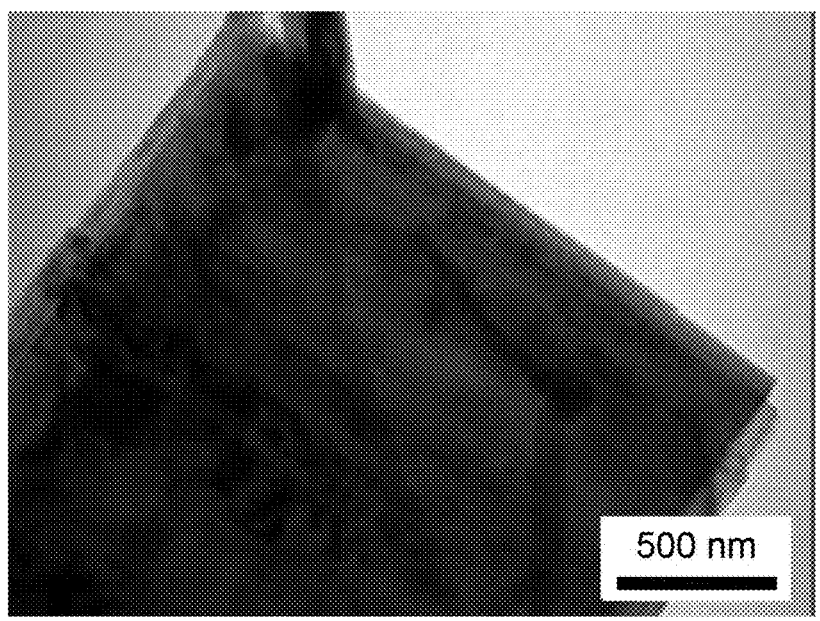
FIG. 4F and FIG. 4G illustrate TEM images of calcinated N-Moc, at high resolution, according to certain embodiments.
Figure 4G:
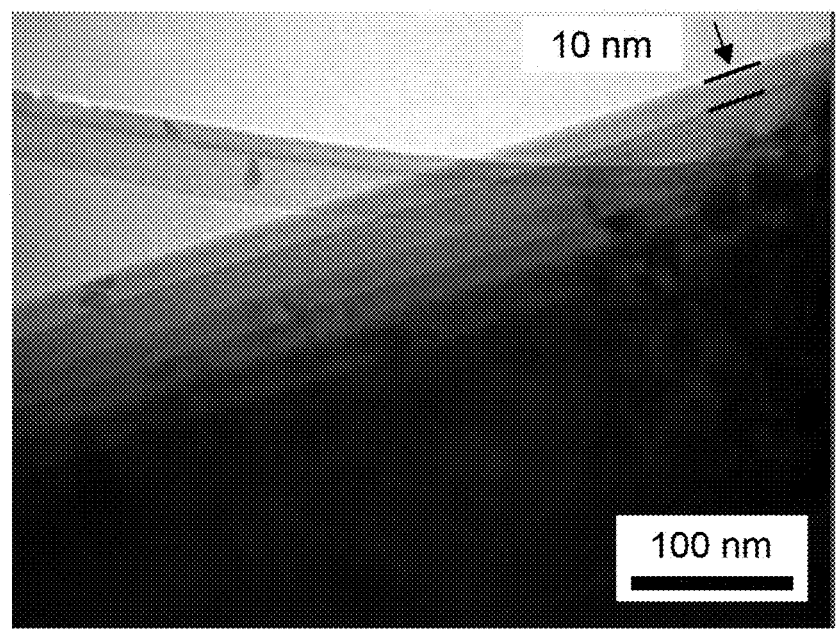
Figure 4H:
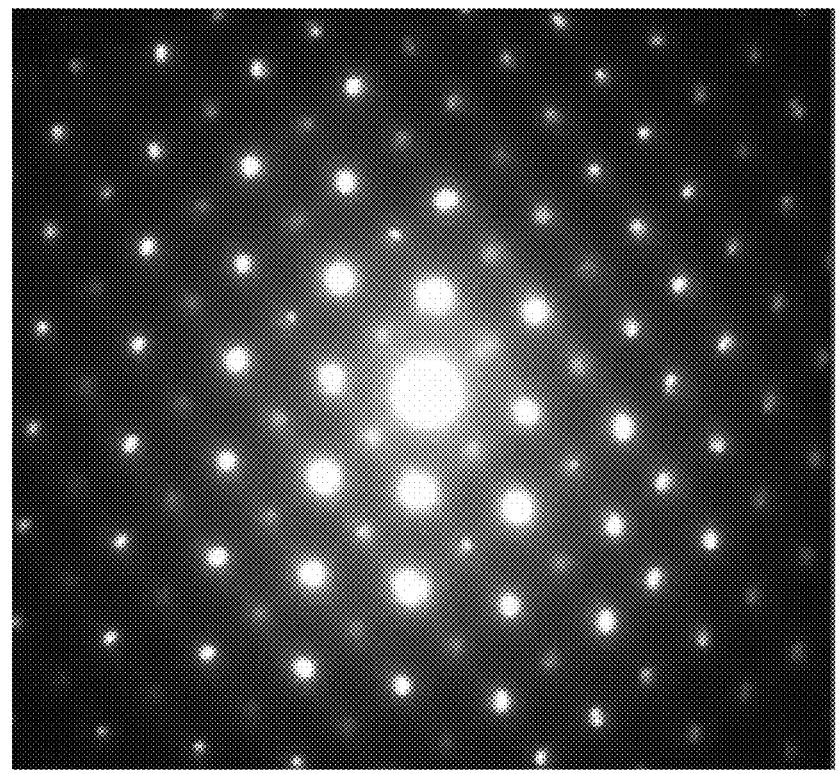
FIG. 4H illustrates SAED patterns of calcined N—MoC, according to certain embodiments.

FIGS. 4A and 4E showed the SEM micrographs of the N—MoC before and after calcination, for comparison. It can be observed that before calcination, the AMT-Atri particles showed the irregular sides and edges with smooth and bright surface, indicating the week crystalline structure. Upon calcination, N—MoC exhibited the layered structure stacking on top of each other with sharp edges and corners, suggesting the strong crystalline nature with a rough surface. This unique structure can provide the efficient channels permitting fast and easy intercalation of the electrolyte ions between the layers. In addition, this may bring more active sites on the electrode surface and increase the surface area which is necessary for ion adsorption. TEM images (FIGS. 4B-4C & 4F-4G) verify the SEM findings that uncalcined AMT-Atri has a non-crystalline and plateless structure while calcined N—MoC displayed the stacked layers and crystalline structure as affirmed further by SAED patterns. SAED pattern (FIG. 4D) of uncalcined AMT-Atri showed the blurred and thin rings (characteristics of weakly ordered structure) whereas the calcined N—MoC displayed the discrete spots with high intensity, suggesting the cubical structure of the plates (FIG. 4H). The high magnification image of TEM helped to measure the distance between two plates on the thin edges of the plates as shown in the FIG. 4G. The adjacent distance between any two layers/plates was estimated around 10 nm. N—MoC has outstanding corrosion resistance and therefore has attracted massive attention in energy storage systems such as electrochemical capacitors.

Figure 5A:
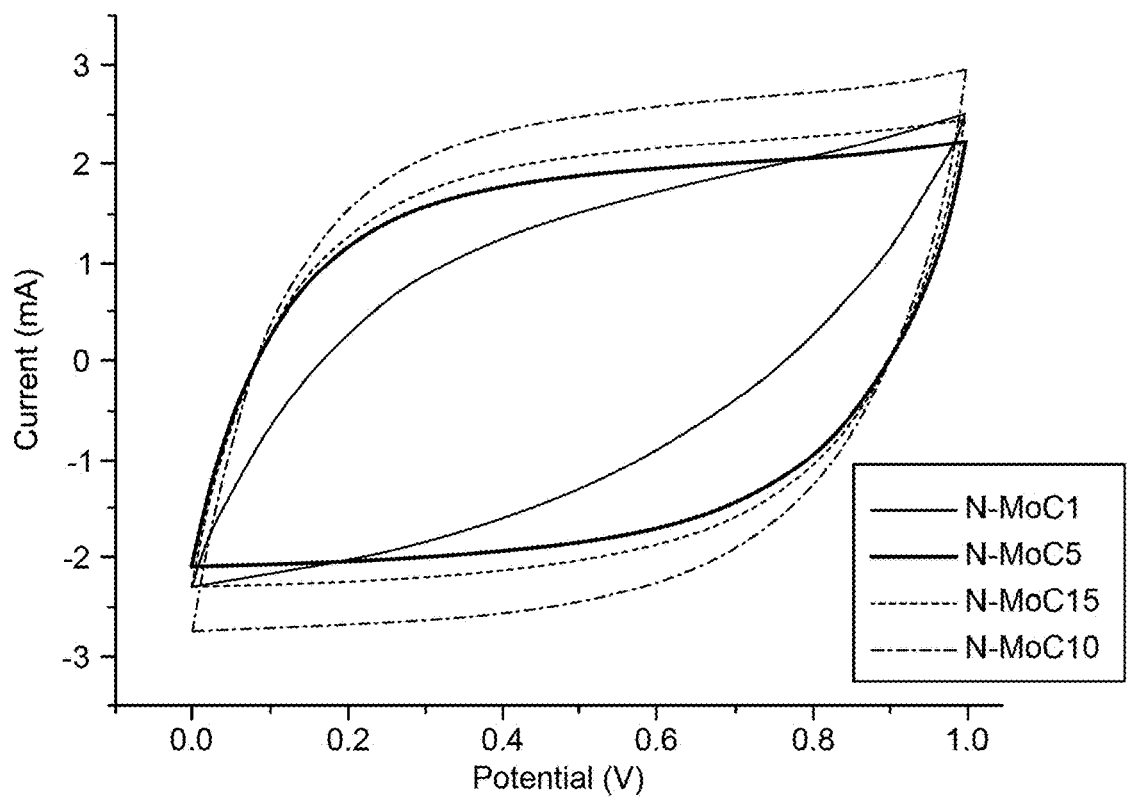
FIG. 5A illustrates cyclic voltammogram (CV) of the cells with various carbon composite electrodes including N—MoC1, N—MoC5, N—MoC10 and N—MoC15 at a scan rate of 10 millivolts per second (mV s−1), according to certain embodiments.
Figure 5B:
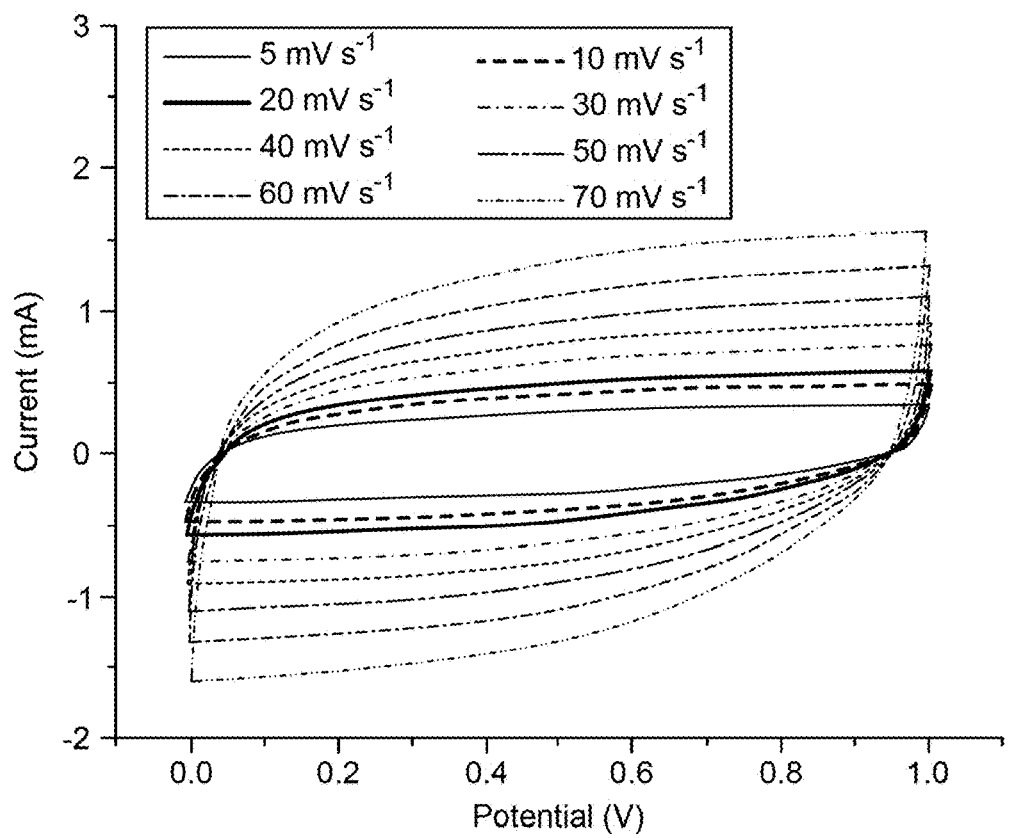
FIG. 5B illustrates CV curves of the device with N—MoC10 at different scan rates, according to certain embodiments.

The electrochemical properties of carbon composite electrodes with N—MoC1, N—MoC5, N—MoC10 and N—MoC15 were evaluated using as assembled supercapacitors in 3M Glycerol-KOH electrolyte. FIG. 5A shows the cyclic voltammetry curves of the devices with these electrodes at 10 millivolt per second (mVs–1) were evaluated at various mass loading of N—MoC. It is clear that the real capacitances were increased with the loading amount which was denoted by the integration of CV areas. Particularly, the device with N—MoC10 loaded electrode illustrated a quasi-rectangular CV shape with a desired storage performance, allowing both EDLC and electron transfer reactions. The CV studies were performed for N—MoC10 at different scan rates ranging from 5 mVs$^{-1}$ to 70 mVs$^{-1}$ (FIG. 5B) Clearly, the quasi-rectangular voltammogram shapes are preserved even at high voltage sweep rates representing the superior ion diffusion onto the electrodes.

Figure 5C:
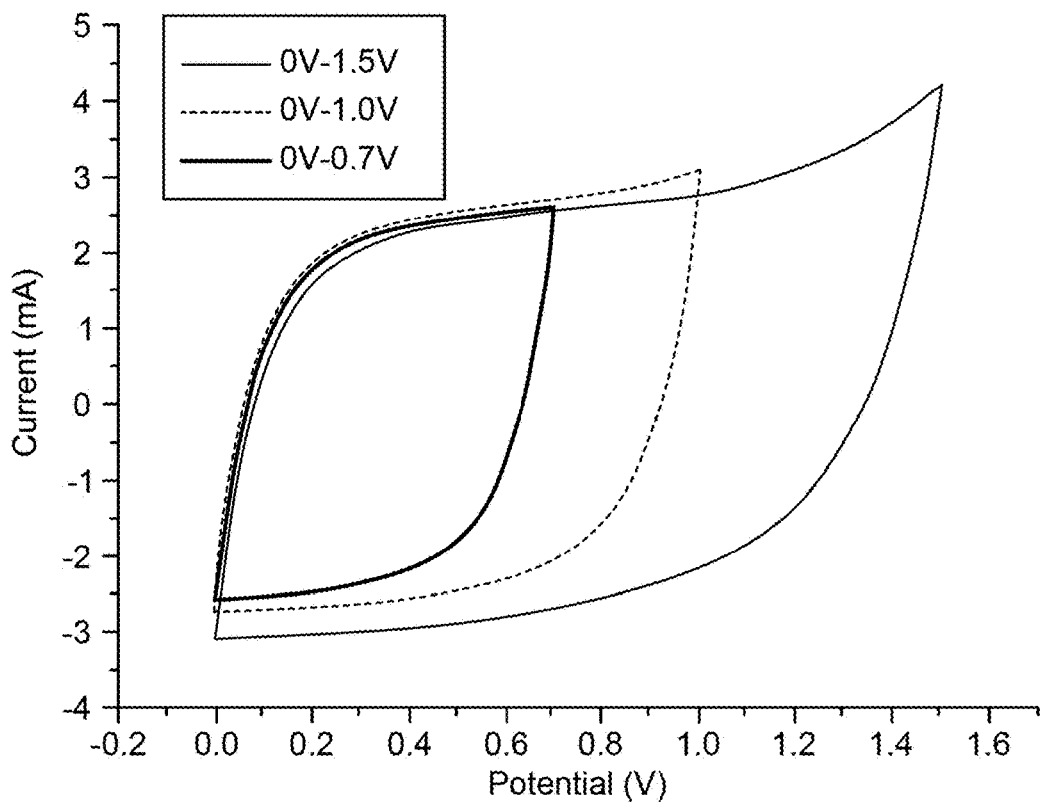
FIG. 5C illustrates CVs of N—MoC10 at various voltage domains at 10 mV s−1, according to certain embodiments.

A series of CV experiments were conducted to determine the electrode stability with respect to increasing potential as illustrated in FIG. 5C. Stable quasi-rectangular CV curves of 0-1.5 V were achieved by moderate increment in current density with increasing the potential.

Figure 5D:
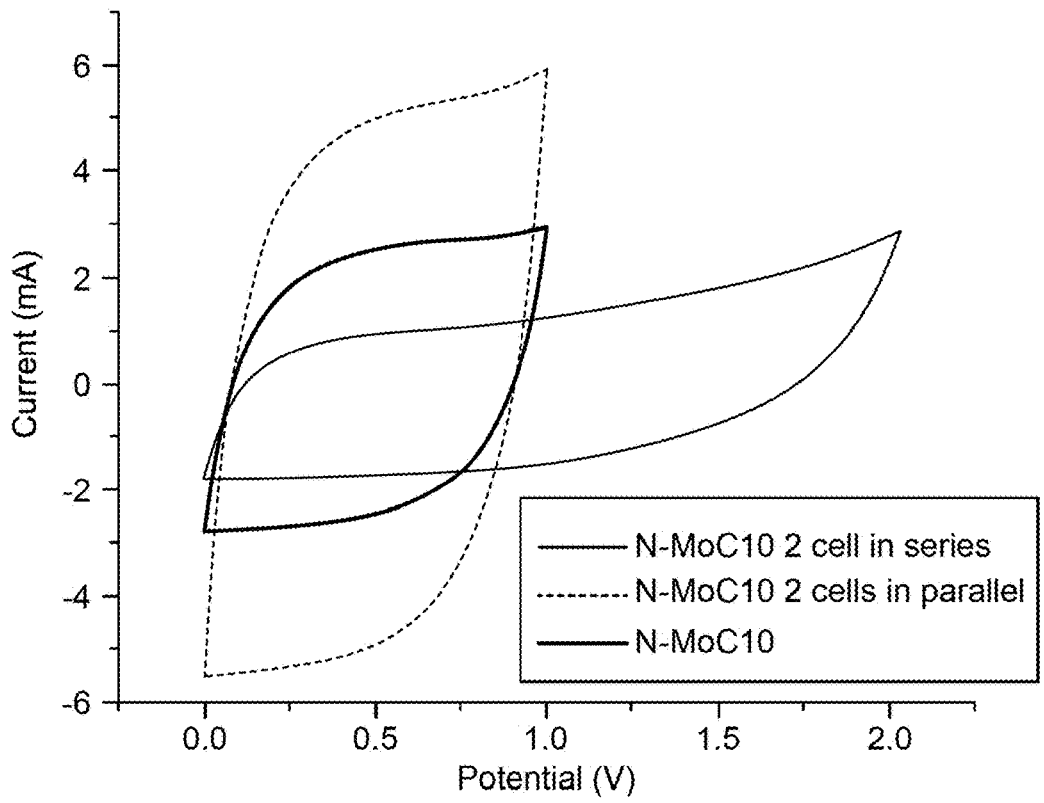
FIG. 5D illustrates comparison of performances in parallel and series cells including N—MoC10 electrodes, according to certain embodiments.

The supercapacitors with the electrode N—MoC10 were assembled into series and parallel connections. FIG. 5D exhibits the cells in series connection having the potential of 2 V at 1 mA current density. Additionally, the discharge time in the parallel connected devices was doubled as compared to the single cell that is related to enhancement of the capacitance of the supercapacitors. The result confirmed highest voltage for series connection and excellent charge storage performance in the parallel connections of the cells.

Figure 5E:
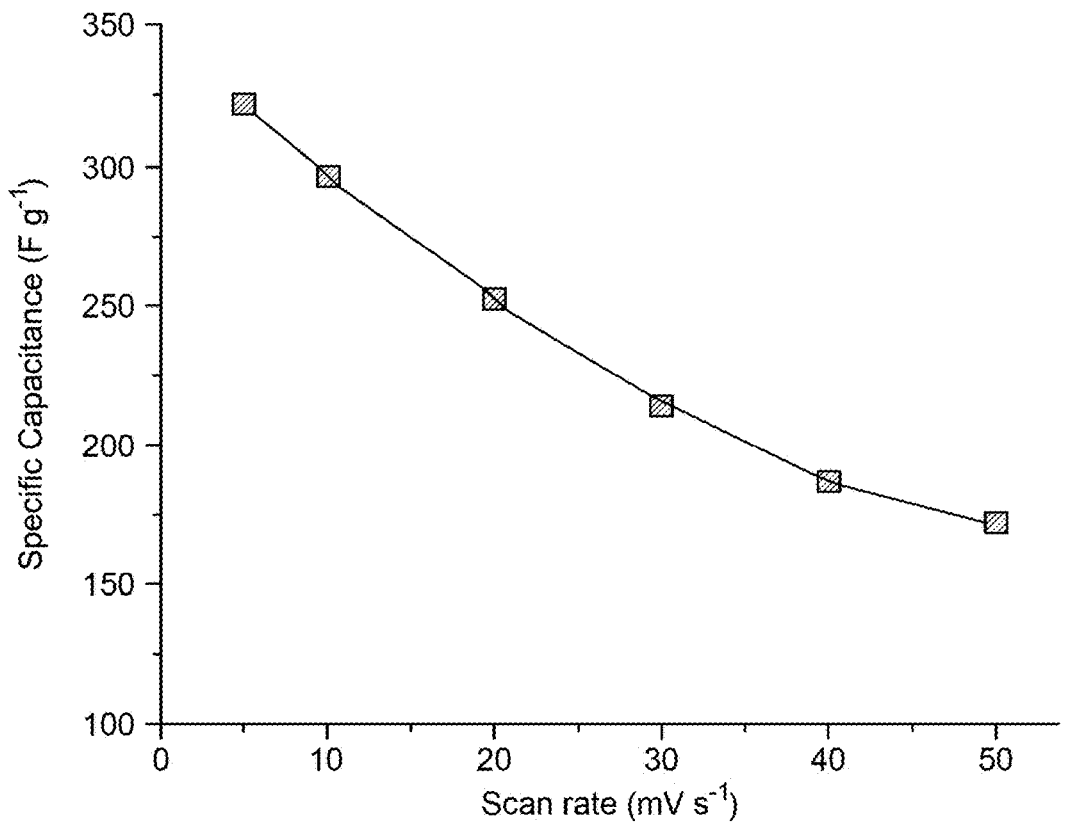
FIG. 5E illustrates specific capacitances of N—MoC10-based device at different scan rates, according to certain embodiments.

FIG. 5E shows the specific capacitance (N-MoC10-based device) variation with scan rate where the data is derived by the integration of CV curves by using the (Eq. S1). As seen, the capacitance decreased with scan rate and maximum capacitance of 335 Fg$^{-1}$ was obtained at a scan rate of 5 mVs–1. As expected, the phenomenon of fast diffusion of ions at high scanning rates resulted in a clearly observed capacitance loss in the supercapacitor device assembled using N—MoC10.

Figure 5F:
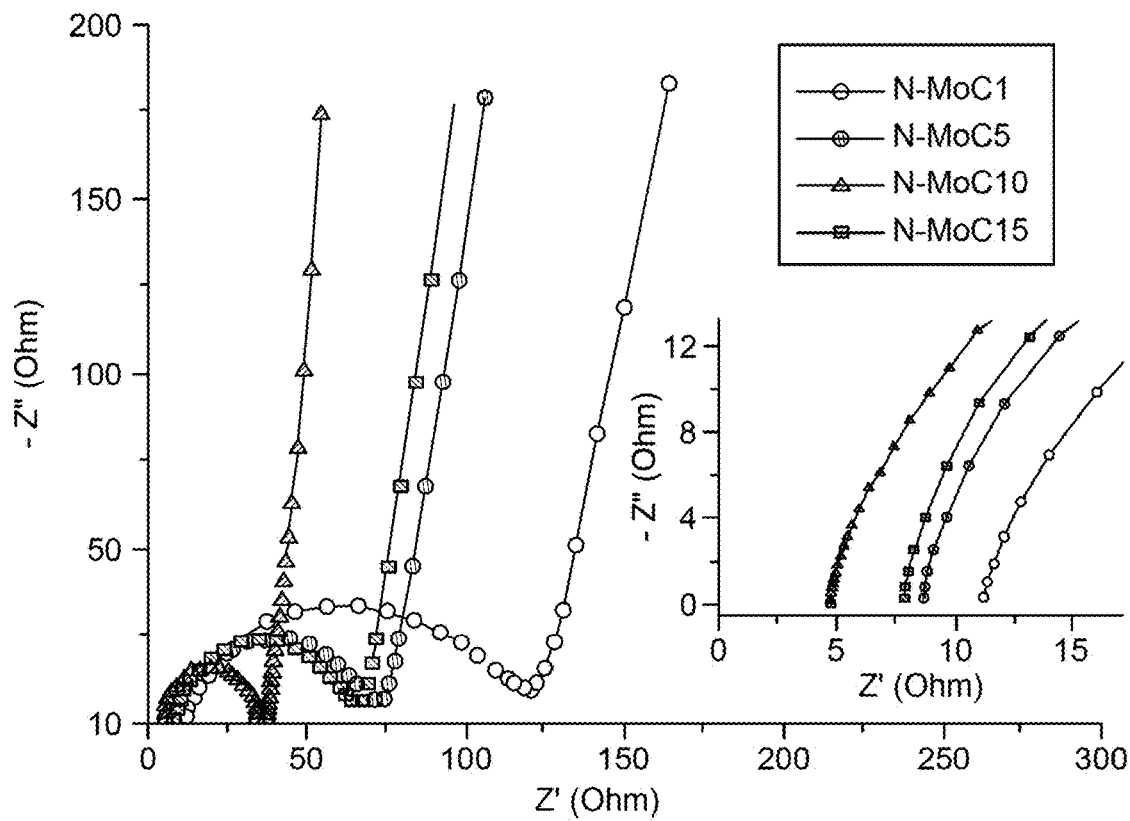
FIG. 5F illustrates Nyquist plots of the N—MoC1, N—MoC5, N—MoC10 and N—MoC15, according to certain embodiments.

FIG. 5F illustrates the Nyquist plots via electrochemical impedance spectroscopy of the supercapacitor devices (N—MoC1, N—MoC5, N-Moc10 and N—MoC15) that exhibited the characteristic distorted semicircles. The internal resistance of the electrodes systems is related to equivalent series resistance (ESR) which was derived from the intersection of x-axis. The ESR value of 4.8 Ohm is obtained for the N-MoC10-based device which is lower than N—MoC1, N—MoC5 and N-MoC15-based devices (11.2, 8.1 and 7.1 ohm, respectively). The ESR values decrease by increasing N—MoCX contents in the carbon composite electrodes with the same electrolyte. Warburg impedance is represented as a straight line in the region of low-frequency to real axis attributed to diffusion-controlled charge transport kinetics which is related to transport of ions from the electrolyte into the electrodes. The semicircle radii of the N-MoC10-based cell showing the charge transfer resistance (Rct), are smaller than those of N—MoC1, N—MoC5 and N—MoN15. An equivalent circuit was used to obtain the Rct data, and the values were derived accordingly. This specifies a faster ion transfer rates on the N—MoC10 electrodes.

The ion conductivity of the electrolyte was calculated at ambient temperature from the equation:

$$\sigma = L/R(\Omega \times A$$

where L is electrode thickness (cm), σ is conductivity (S cm$^{-1}$), A is surface area (cm$^2$) and R is resistivity (Ω) which is derived from the EIS measurements. The highest capacitance was obtained for the electrode N—MoC10 and the ionic conductivity of 2.6×10-3 S cm$^{-1}$ was calculated at ambient temperature.

Figure 6A:
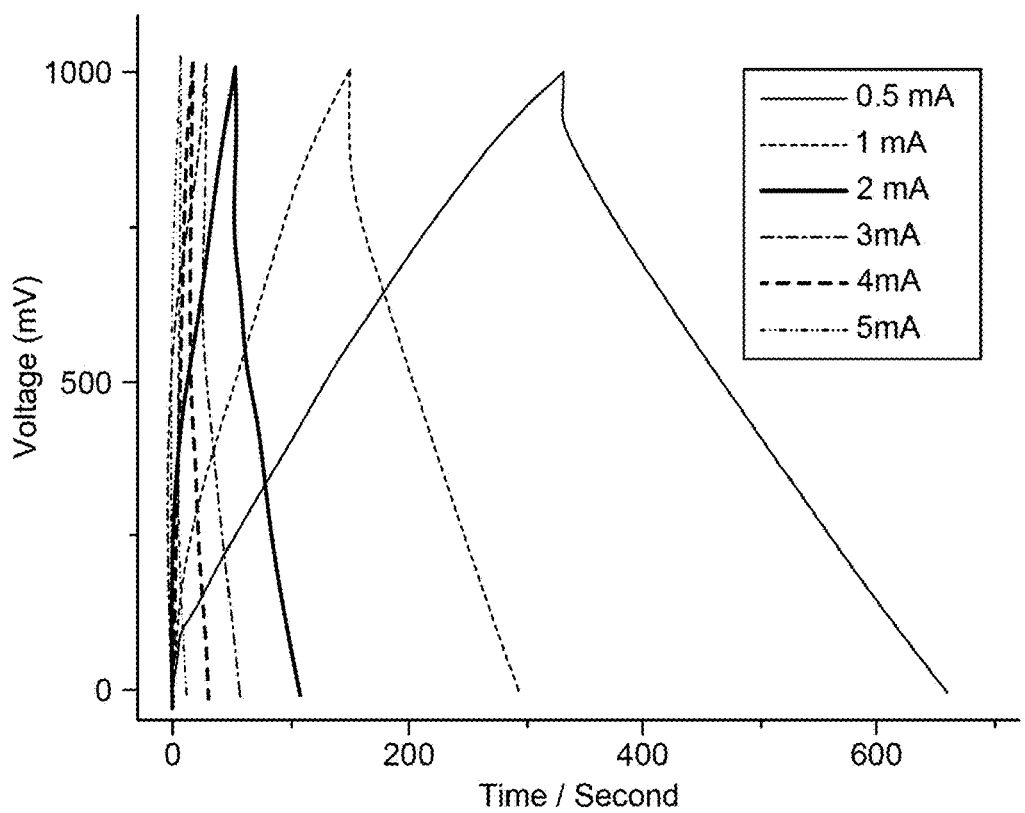
FIG. 6A illustrates galvanostatic charge/discharge (GCD) curves of supercapacitors at different charge-discharge current for N—MoC1, according to certain embodiments.
Figure 6B:
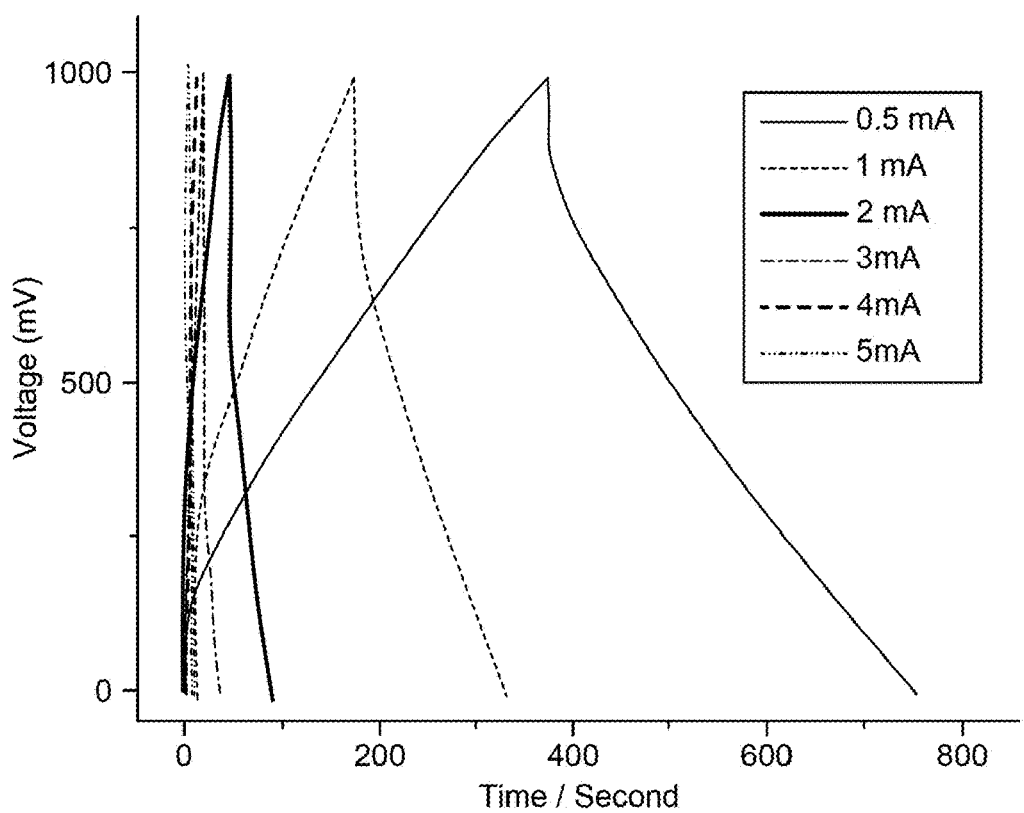
FIG. 6B illustrates the GCD curves of supercapacitors at different charge-discharge current for N—MoC5, at various current values, according to certain embodiments.
Figure 6C:
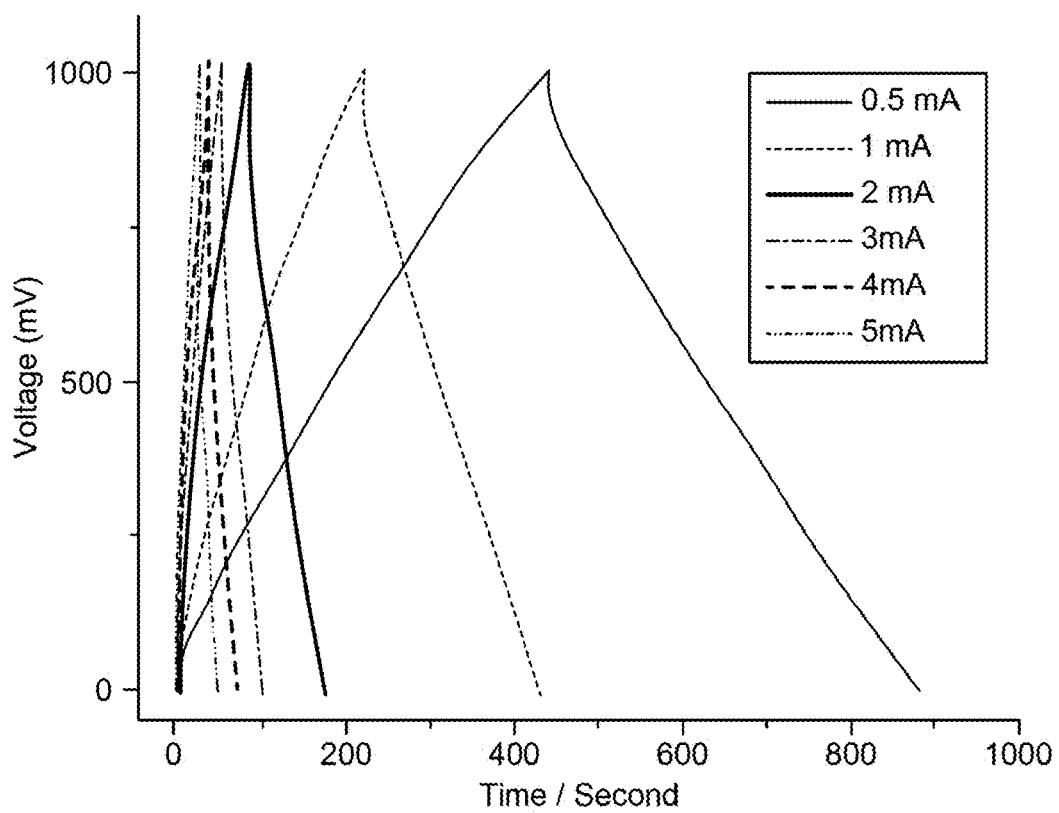
FIG. 6C illustrates the GCD curves of supercapacitors at different charge-discharge current for N—MoC10, at various current values, according to certain embodiments.

FIGS. 6A-6C demonstrate the GCD curves of N—MoC1, N—MoC5, and N—MoC10 at a charge-discharge current of 0.5 mA. All curves display similar triangular shapes which are consistent with the analysis of corresponding CV curves.

Figure 6D:
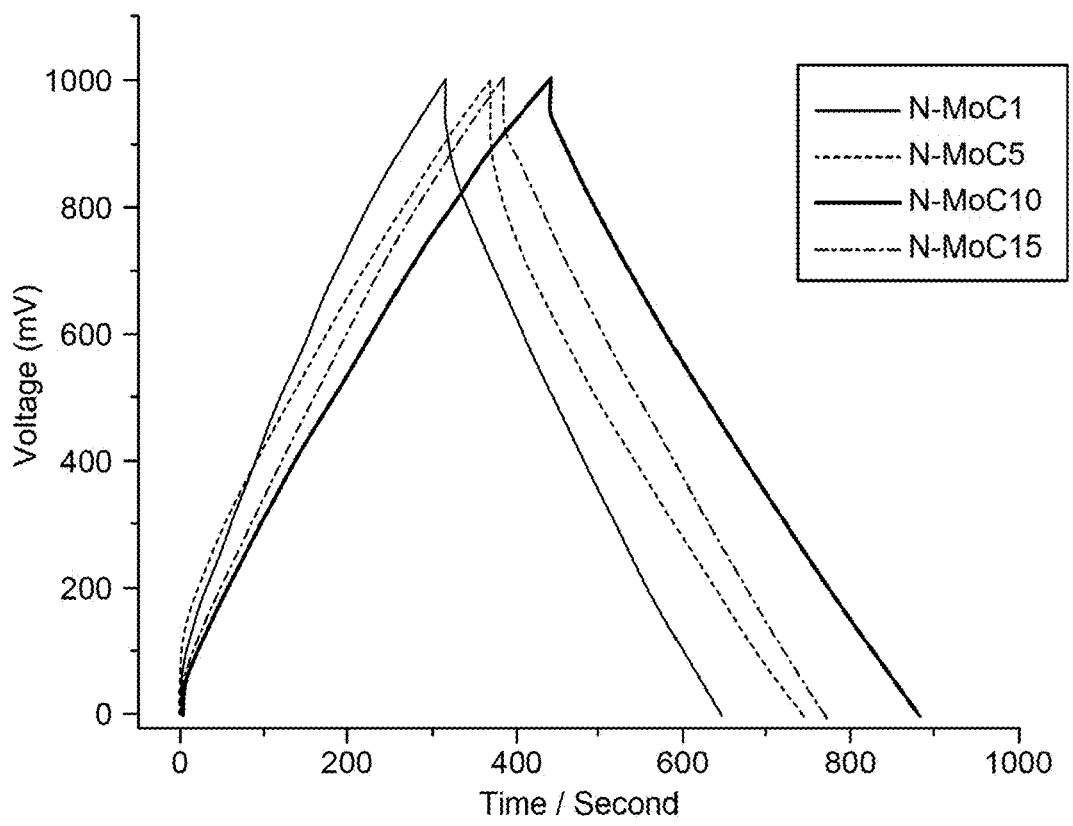
FIG. 6D illustrates comparison of the GCD curves of N—MoC1, N—MoC5, N—MoC10 and N—MoC15 at 0.5 milli ampere (mA) current, according to certain embodiments.

The comparison of the GCD curves (FIG. 6D) indicated that N—MoC10 has the maximum charge storage performance as confirmed by the longest discharge time. The existence of electrochemically active N-doped MoC/MoO$_3$ multilayered structure could be the reason for high capacitive performance. Moreover, GCD curve of N—MoC10 possesses less IR drop when compared to other samples which proves the higher conductivity through the double layer formation.

Figure 6E:
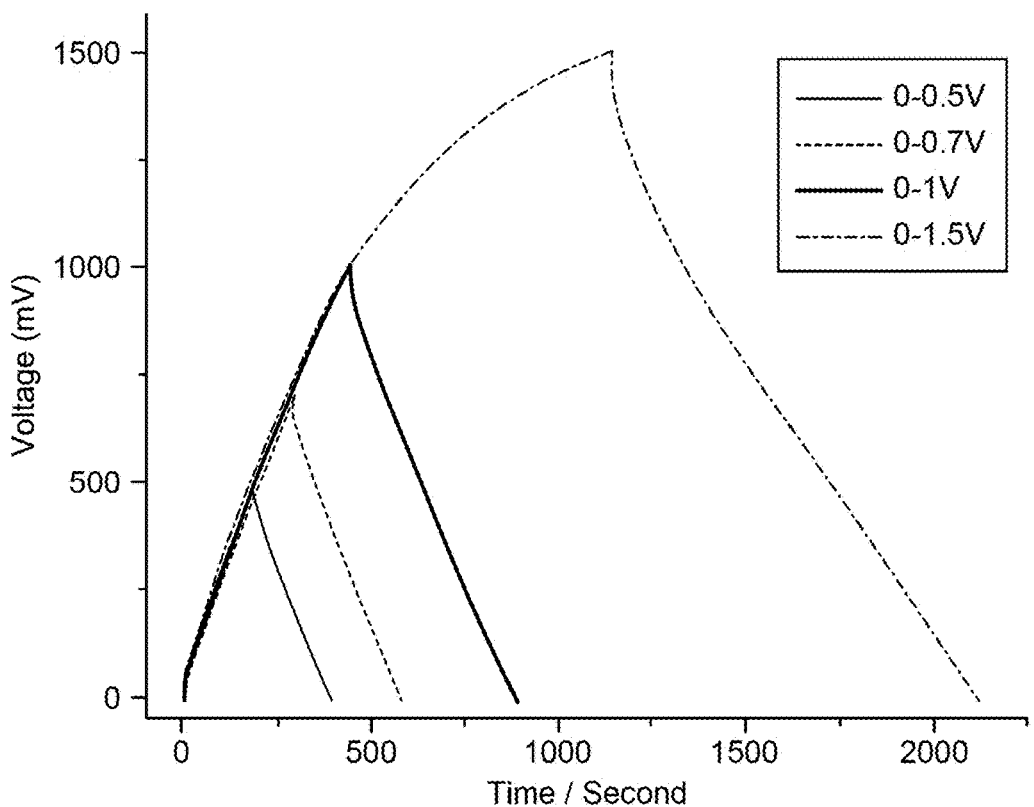
FIG. 6E illustrates the GCD measurements of N—MoC10 supercapacitor obtained at different voltage range at 0.5 mA, according to certain embodiments.

The GCD experiments were conducted to analyze the stability of the N—MoC1, N—MoC5 and N—MoC10 devices at different voltage windows as illustrated in FIG. 6E. The stability window of the device was tested at 0-0.5 V, 0-0.75 V, 0-1 V and 0-1.5 V, at a constant current density of 0.5 mA. The results exhibited that the assembled device is stable within 0-1.5 V and this domain can be selected as the cell potential.

Figure 6F:
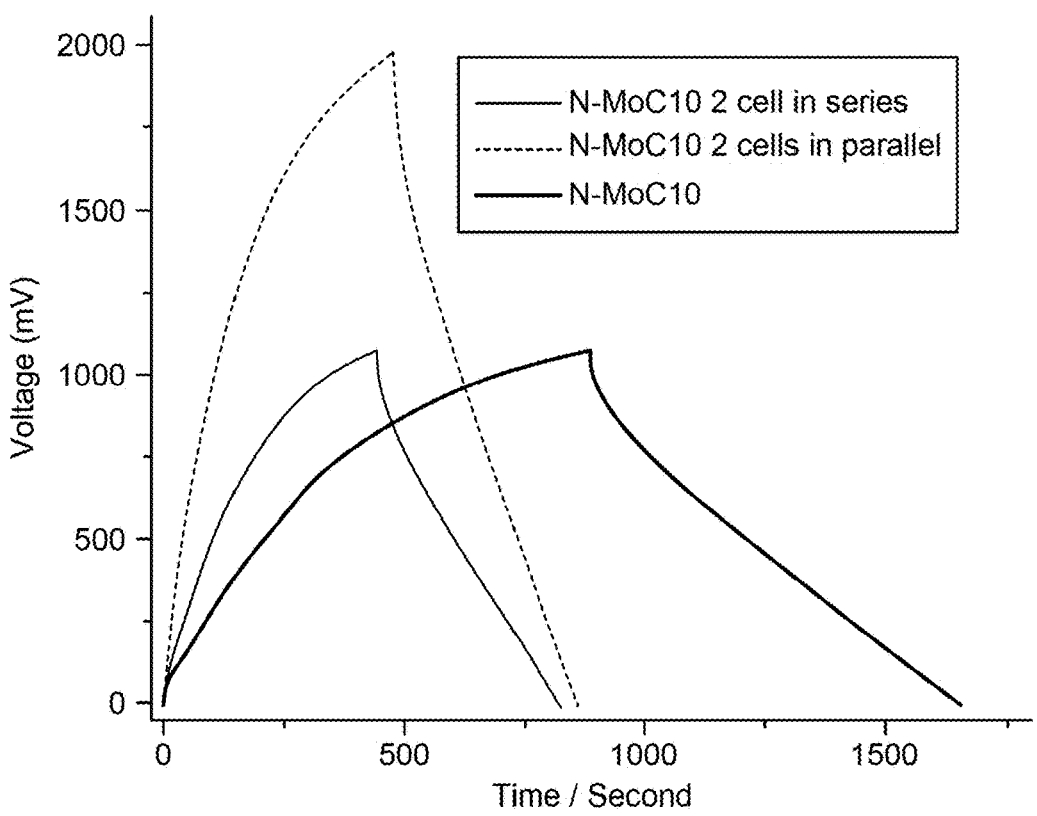
FIG. 6F illustrates the GCD profiles of two cells connected in series and parallel at 0.5 mA current, according to certain embodiments.

FIG. 6F exhibits the cells in series connection having the potential of 2 V at 0.5 mA current. Additionally, the discharge time in the parallel connected devices was almost doubled as compared to the single cell that related to enhancement of the capacitance of the supercapacitors. The results confirmed highest voltage for series connection of the cells and improved the capacitance with the parallel connection of the cells. As seen, the GCD curves maintain the analogously triangular shapes with negligible curvature. The outstanding electrochemical reversibility can be confirmed by the nearly symmetrical shape. N—MoC10 device shows a negligible IR drop at lower current (0.5 mA), but it becomes more at higher rates, whereas N—MoC1, N—MoC5 and N—MoC15 have remarkable IR drops.

Figure 7G:
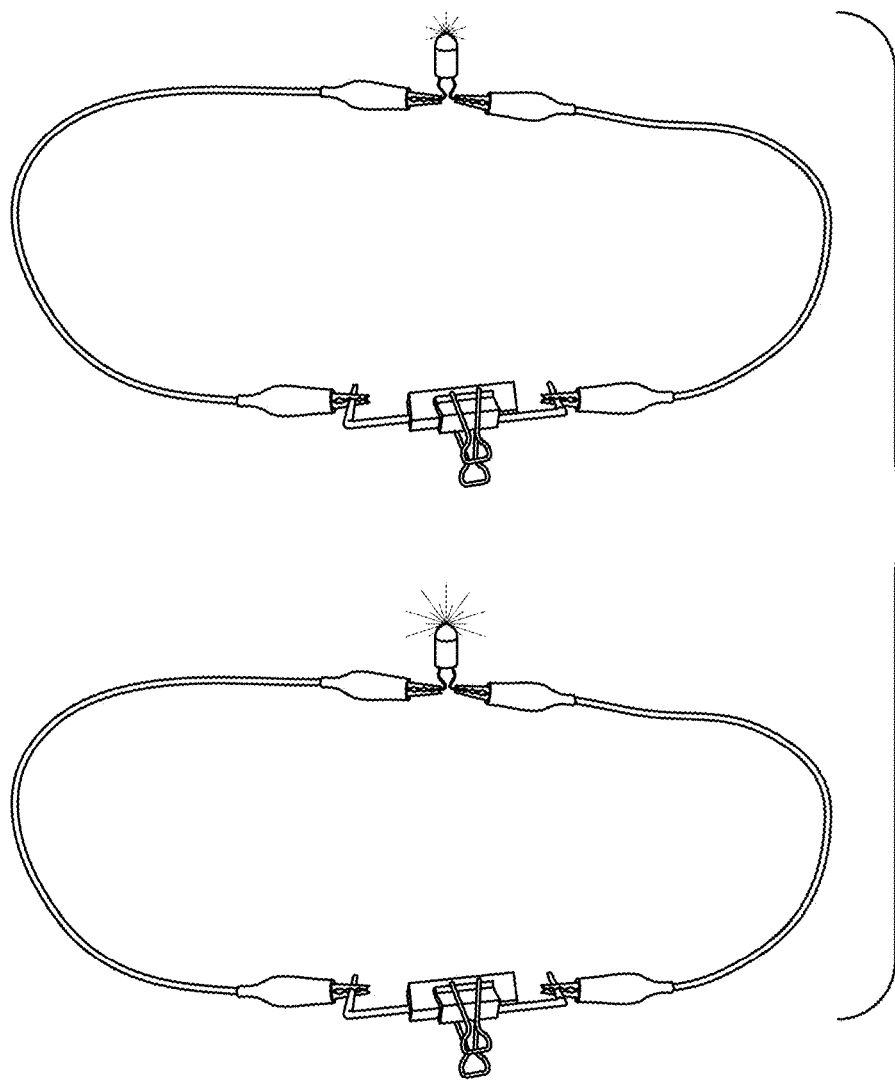
FIG. 7G illustrates real images of MoC10-based device operating light emitting diode (LED), according to certain embodiments.

FIG. 7A to FIG. 7G illustrate the specific capacitance of pure carbon, N—MoC1, N—MoC5, N—MoC10 and N—MoC15 at different specific current values (FIG. 7A), Ragone plot (FIG. 7B), N-cyclic performance of MoC10-based device at 0.5 mA charge-discharge current (FIG. 7C), columbic efficiency of N—MoC10 at different days (FIG. 7D), CV of N—MoC10 obtained at different days (FIG. 7E), real images of the supercapacitor device at different status (FIG. 7F), and Real images of MoC10-based device operating red and green LED (FIG. 7G).

The total specific capacitance of N—MoC10 was calculated using the equations (Eq.2) as 324 F g$^{-1}$ at 0.5 mA and 295 F g$^{-1}$ at 5 mA (FIG. 7A). As the current density varied from 0.5 mA to 5 mA, a 92% of the capacitance of N—MoC10 was retained exhibiting higher rate capability. Ragone plots obtained from GCD experiments were conducted to perform total specific energy with respect to specific power (FIG. 7B). The specific energy of the devices found to be reduced at higher rates in agreement with the CV data. This behavior may indicate the effective EDLC and thus, redox processes can be limited at higher rates via reducing the specific capacitance. It can also be mentioned that N—MoC10 delivered a maximum specific energy of 37.5 Wh kg-1 at a specific power of 2.485 W kg-1 (Eq.3 and Eq.4) is the desired composition and further addition of N—MoC diminishes the performance of the supercapacitor. Hence, the device with N—MoC10 illustrated a better performance in terms of specific energy within whole domain of specific power.

The cycle stability of the N—MoC10 supercapacitor device was conducted by applying the 10.000 cyclic GCD experiments. Experiments were carried out using the similar supercapacitor devices at an applied current density of 1 mA. The N—MoC10 supercapacitor reflected remarkable retention of performance (88%) after 10,000 cyclic GCD measurements. Columbic efficiency loss was obtained after the same measurement period of approximately 11%, probably due to the loss of ion transfer capability of the electrode after each charge-discharge cycle (FIG. 7C).

The long-term storage stability test was performed for N—MoC10 electrode including supercapacitor device, for 30 days at room temperature. The device performance was tested by GCD, and CV analysis reported in FIGS. 7D and 7E. The drop in specific capacitance was observed from 324 F $g^{-1}$ to 280 F $g^{-1}$ after a period of 30 days. This can be explained as the blockage or deformation of ion transfer channels inside the electrodes. The CV studies show the stability of the device with N—MoC10 as per 30 days in FIG. 7E. It is clear in the area of the CV curves that the device keeps 90% of the initial capacitance even after 30 days.

The devices were successfully assembled with N—MoC10 and demonstrated excellent flexibility and tailorable bending property as illustrated at various forms (FIG. 7F). Excellent operational property has been observed from the supercapacitor fabricated at the dimension of 1 to 3 cm, successfully powered the LED when charged to 2.7 V (FIG. 7G).

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for incorporating nitrogen-doped molybdenum carbide nanosheets into a nanocomposite electrode, comprising:
    forming the nitrogen-doped molybdenum carbide nanosheets by:
        reacting an ammonium molybdate with an amine substituted heterocycle to form a reaction product; and
        thermally treating the reaction product under nitrogen;
    mixing at least one binding compound, at least one conductive additive, and at least one electrolyte to form a slurry;
    mixing the nitrogen-doped molybdenum carbide nanosheets with the slurry to form a synthesis mixture;
    coating the synthesis mixture onto a surface of an electrode substrate; and
    drying the nanocomposite electrode at a temperature less than 100° C. to form the nanocomposite electrode;
    wherein the nanocomposite electrode comprises:
    the electrode substrate;
    the nitrogen-doped molybdenum carbide nanosheets;
    the at least one electrolyte;
    the at least one binding compound; and
    the at least one conductive additive;
    wherein the electrolyte at least partially penetrates pores of the nitrogen-doped molybdenum carbide nanosheets; and
    wherein the nitrogen-doped molybdenum carbide nanosheets are an outer layer of the nanocomposite electrode.

2. The method of claim 1, wherein the mixture comprises:
    1-15 wt. % of the nitrogen-doped molybdenum carbide nanosheets; and
    85-99 wt. % of the electrolyte, the conductive additive, and the binding compound, based on the total weight of the nitrogen-doped molybdenum carbide nanosheets, the conductive additive, the binding compound, and the electrolyte.

3. The method of claim 1, wherein:
    the electrolyte is at least one polyol compound mixed with at least one selected from the group consisting of an alkali metal hydroxide, an alkaline earth hydroxide, an alkali metal salt, and an alkaline earth salt;
        wherein the polyol compound is at least one selected from the group consisting of glycerol, ethylene glycol, and propylene glycol;
        wherein the binding compound is at least one selected from the group consisting of polyvinylidene fluoride and N-methyl pyrrolidone;
        wherein the conductive additive is at least one selected from the group consisting of graphite, activated carbon, reduced graphene oxide, carbon nanotubes, carbon nanofibers, and carbon black; and
        wherein the electrode substrate is a mesh made from at least one of the materials selected from the group consisting of stainless steel, aluminum, nickel, copper, platinum, zinc, tungsten, and titanium.

4. The method of claim 1, wherein:
    the synthesis mixture coated on the electrode substrate has contact angle less than 40°.

5. The method of claim 1, wherein the nitrogen-doped molybdenum carbide nanosheets have a substantially crystalline structure with a spacing of 5-15 nm between each nanosheet.

6. The method of claim 1, wherein the nitrogen-doped molybdenum carbide nanosheets have:
    a surface area of 250-300 $m^2/g$; and
    a pore size of 5-15 nm.

7. The method of claim 1, wherein:
    the nitrogen-doped molybdenum carbide nanosheets comprise $MoO_3$, $Mo_2C$, and $Mo_2N$ phases.

8. The method of claim 1, wherein the ammonium molybdate is $(NH_4)_6Mo_7O_{24} \cdot H_2O$.

9. The method of claim 1, wherein the amine substituted heterocycle is amino triazole.

10. The method of claim 1, wherein reacting the ammonium molybdate with the amine substituted heterocycle includes mixing a solution of the ammonium molybdate in a first protic solvent with a solution of the amine substituted heterocycle in a second protic solvent.

11. The method of claim 1, wherein thermally treating includes calcining at a temperature of 800° C.

12. The method of claim 1, further comprising:
    after the thermally treating, pulverizing the reaction product to form nitrogen-doped molybdenum carbide nanosheets having a pore size of 5-15 nm.

* * * * *